(12) United States Patent
Hariton

(10) Patent No.: US 11,120,596 B2
(45) Date of Patent: *Sep. 14, 2021

(54) SYSTEMS AND METHODS FOR UTILIZING A LIVING ENTITY AS A MARKER FOR AUGMENTED REALITY CONTENT

(71) Applicant: Nicholas T. Hariton, Sherman Oaks, CA (US)

(72) Inventor: Nicholas T. Hariton, Sherman Oaks, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/062,227

(22) Filed: Oct. 2, 2020

(65) Prior Publication Data

US 2021/0019927 A1 Jan. 21, 2021

Related U.S. Application Data

(63) Continuation of application No. 16/835,242, filed on Mar. 30, 2020, now Pat. No. 10,796,467, which is a
(Continued)

(51) Int. Cl.
*G06T 19/00* (2011.01)
*G06T 11/60* (2006.01)
(Continued)

(52) U.S. Cl.
CPC .......... *G06T 11/60* (2013.01); *G06K 9/00369* (2013.01); *G06T 7/74* (2017.01);
(Continued)

(58) Field of Classification Search
CPC .................................................. G06T 19/006
See application file for complete search history.

(56) References Cited

U.S. PATENT DOCUMENTS 2,015,027 A 9/1935 Finley
7,274,380 B2 9/2007 Navab
(Continued)

FOREIGN PATENT DOCUMENTS

WO 2014147686 9/2014
WO 2018055459 3/2018

OTHER PUBLICATIONS

Caroly Giardina, New Venture Aims to Creat Al-Driven Digital "Copies" of Hollywood Stars; published Jun. 28, 2017; [retrieved Sep. 18, 2017] retrieved from the Internet http://www.hollywoodreporter.com/behind-screen/new-venture-aims-create-ai-driven-digital-copies-hollywood-stars-1017298 (2 pages).
(Continued)

*Primary Examiner* — Matthew Salvucci
(74) *Attorney, Agent, or Firm* — Esplin & Associates, PC

(57) ABSTRACT

Systems and methods for utilizing living entities as markers for virtual content in an augmented reality environment are discussed herein. The virtual content may comprise objects, surfaces, textures, effects, and/or other content visibly manifested in views of the augmented reality environment. In some implementations, the virtual content may comprise an avatar and/or other full- or partial-body virtual content object depicted based on the living entity. A living entity and multiple linkage points for the living entity may be detected within the field of view of a user. Based on the arrangement of the linkage points, virtual content may be rendered and appear superimposed over or in conjunction with a view of the living entity in the augmented reality environment. In some implementations, the rendering of virtual content in the augmented reality environment may be triggered by the arrangement of the multiple linkage points for a given living entity.

20 Claims, 6 Drawing Sheets

Related U.S. Application Data continuation of application No. 15/893,498, filed on Feb. 9, 2018, now Pat. No. 10,636,188.

(51) Int. Cl.
| | | |
|---|---|---|
| G06T 7/73 | (2017.01) | |
| G06T 13/80 | (2011.01) | |
| G06K 9/00 | (2006.01) | |
| G06T 11/00 | (2006.01) | |
| G10L 17/00 | (2013.01) | |

(52) U.S. Cl.
CPC .............. *G06T 11/00* (2013.01); *G06T 13/80* (2013.01); *G06T 19/00* (2013.01); *G06T 19/006* (2013.01); *G06T 2207/30196* (2013.01); *G06T 2207/30204* (2013.01); *G10L 17/00* (2013.01)

(56) References Cited

U.S. PATENT DOCUMENTS

| | | | |
|---|---|---|---|
| 7,373,377 | B2 | 5/2008 | Altieri |
| 7,774,027 | B2 | 8/2010 | Parikh |
| 8,139,067 | B2 | 3/2012 | Anguelov |
| 8,228,325 | B2 | 7/2012 | Barbaro Altieri |
| 8,275,590 | B2 | 9/2012 | Szymczyk |
| 8,451,266 | B2 | 5/2013 | Hertenstein |
| 8,458,028 | B2 | 6/2013 | Altieri |
| 8,462,198 | B2 | 6/2013 | Lin |
| 8,473,835 | B2 | 6/2013 | Hariton |
| 8,490,007 | B1 | 7/2013 | Hoffman |
| 8,847,953 | B1 | 9/2014 | Cho |
| 9,001,118 | B2 | 4/2015 | Molyneaux |
| 9,041,622 | B2 | 5/2015 | MCulloch |
| 9,230,367 | B2 | 1/2016 | Stroila |
| 9,251,626 | B2 | 2/2016 | Wang |
| 9,317,670 | B2 | 4/2016 | Gudlavenkatasiva |
| 9,323,325 | B2 | 4/2016 | Perez |
| 9,324,318 | B1 | 4/2016 | Bunn |
| 9,345,957 | B2 | 5/2016 | Geisner |
| 9,354,702 | B2 | 5/2016 | Mullins |
| 9,374,788 | B2 | 6/2016 | Singamsetti |
| 9,400,593 | B2 | 7/2016 | Hariton |
| 9,709,983 | B2 | 7/2017 | Seydoux |
| 9,792,584 | B2 | 10/2017 | Hariton |
| 10,102,659 | B1 | 10/2018 | Hariton |
| 10,105,601 | B1 | 10/2018 | Hariton |
| 10,198,871 | B1 | 2/2019 | Hariton |
| 10,565,767 | B2 | 2/2020 | Hariton |
| 10,586,396 | B1 | 3/2020 | Hariton |
| 10,593,121 | B2 | 3/2020 | Hariton |
| 10,636,188 | B2 | 4/2020 | Hariton |
| 10,661,170 | B2 | 5/2020 | Hariton |
| 10,672,170 | B1 | 6/2020 | Hariton |
| 10,679,427 | B1 | 6/2020 | Hariton |
| 10,796,467 | B2 | 10/2020 | Hariton |
| 10,818,096 | B1 | 10/2020 | Hariton |
| 10,846,931 | B1 | 11/2020 | Hariton |
| 10,861,245 | B2 | 12/2020 | Hariton |
| 10,867,424 | B2 | 12/2020 | Hariton |
| 2008/0284777 | A1 | 11/2008 | Altieri |
| 2009/0288150 | A1 | 11/2009 | Toomim |
| 2011/0018903 | A1 | 1/2011 | Lapstun |
| 2011/0292076 | A1 | 12/2011 | Wither |
| 2012/0001938 | A1 | 1/2012 | Sandberg |
| 2012/0075430 | A1 | 3/2012 | Ito |
| 2012/0077584 | A1 | 3/2012 | Sarmenta |
| 2012/0113223 | A1 | 5/2012 | Hilliges |
| 2012/0122570 | A1 | 5/2012 | Baronoff |
| 2012/0209714 | A1 | 8/2012 | Douglas |
| 2012/0218263 | A1 | 8/2012 | Meier |
| 2013/0083173 | A1 | 4/2013 | Geisner |
| 2013/0201215 | A1 | 8/2013 | Martellaro |
| 2013/0278635 | A1 | 10/2013 | Maggiore |
| 2013/0326364 | A1 | 12/2013 | Latta |
| 2013/0342572 | A1 | 12/2013 | Poulos |
| 2014/0007247 | A1 | 1/2014 | Carter |
| 2014/0035901 | A1 | 2/2014 | Jiawen |
| 2014/0091984 | A1 | 4/2014 | Ashbrook |
| 2014/0122737 | A1 | 5/2014 | Silberstein |
| 2014/0248950 | A1 | 9/2014 | Tosas Bautista |
| 2014/0368537 | A1 | 12/2014 | Salter |
| 2015/0050994 | A1 | 2/2015 | Mangold |
| 2015/0235423 | A1 | 8/2015 | Tobita |
| 2015/0346722 | A1 | 12/2015 | Herz |
| 2015/0356781 | A1 | 12/2015 | Miller |
| 2015/0371447 | A1 | 12/2015 | Yasutake |
| 2016/0110922 | A1 | 4/2016 | Haring |
| 2016/0179455 | A1 | 6/2016 | Liu |
| 2016/0187654 | A1 | 6/2016 | Border |
| 2016/0203586 | A1 | 7/2016 | Chang |
| 2016/0210780 | A1 | 7/2016 | Paulovich |
| 2016/0314716 | A1 | 10/2016 | Grubbs |
| 2017/0092002 | A1 | 3/2017 | Mullins |
| 2017/0337858 | A1 | 11/2017 | Vartanian |
| 2018/0018825 | A1 | 1/2018 | Kim |
| 2018/0096507 | A1 | 4/2018 | Valdivia |
| 2018/0126620 | A1 | 5/2018 | Talgorn |
| 2018/0201370 | A1 | 7/2018 | Yang |
| 2019/0087995 | A1 | 3/2019 | Hariton |
| 2019/0126149 | A1 | 5/2019 | Hariton |
| 2019/0248485 | A1 | 8/2019 | Ulaganathan |
| 2019/0251720 | A1 | 8/2019 | Hariton |
| 2019/0324539 | A1 | 10/2019 | Wu |
| 2019/0333277 | A1 | 10/2019 | Hariton |
| 2020/0092287 | A1 | 3/2020 | Cano |
| 2020/0110560 | A1 | 4/2020 | Hariton |
| 2020/0151930 | A1 | 5/2020 | Hariton |
| 2020/0175772 | A1 | 6/2020 | Hariton |
| 2020/0222805 | A1 | 7/2020 | Hariton |
| 2020/0226809 | A1 | 7/2020 | Hariton |
| 2020/0226810 | A1 | 7/2020 | Hariton |
| 2020/0246699 | A1 | 8/2020 | Hariton |
| 2020/0349767 | A1 | 11/2020 | Hariton |
| 2020/0349771 | A1 | 11/2020 | Hariton |

OTHER PUBLICATIONS

David Kariuki, 7 firms with face tracking tech for better VR avatars, Hypergrid Business; Nov. 20, 2016, retrieved from the internet http://www.hypergridbusiness.com/2016/11/ai-emotion-and-facial-tracking-to-help-make-vr-avatars-more-realistic/ (16 pages).

Josh Constine, Augmented Reality For Trying On Makeup Is A Booming Business Posted Jan. 19, 2016 by Josh Constine (@joshconstine)—TechCrunch, retrieved from the Internet https://techcrunch.com/2016/01/19/facial-precognition/ (9 pages).

Kato, et al., Marker Tracking and HMD Calibration for a Video-based Augmented Reality Conferencing System, in Proceedings of the 2nd International Workshop on Augmented Reality (IWAR 99). Oct. 1999, [retrieved Dec. 7, 2009] retrieved from the Internet <http://www.hitl.washington.edu/artoolkit/Papers/IWAR99.kato.pdf> (10 pages).

Mashalkar, et al., Personalized Animatable Avatars from Depth Data, Joint Virtual Reality Conference of EGVE—EuroVR (2013), [retrieved Sep. 18, 2017] retrieved from the internet https://www.cse.iitb.ac.in/~paragc/pubs/papers/paper_jvrc2013.pdf (8 pages).

Mindshow promotional video, Mindshow Official Trailer—Create Animated Movies in Virtual Reality, YouTube, Published Apr. 14, 2017 [retrieved Sep. 18, 2017] retrieved from the Internet https://www.youtube.com/watch?v=UCVwx_vNe8U, and https://www.youtube.com/watch?v=2p9Cx4iX47E (4 pages).

Mindshow Webpage, About | Mindshow, [retrieved Sep. 18, 2017] retrieved from the Internet https://mindshow.com/about/ (6 pages).

Mindshow Webpage, How it Works, [retrieved Sep. 18, 2017] retrieved from the Internet https://mindshow.com/#how-it-works (4 pages).

Neal Stephenson, Snow Crash; New York : Del Rey, 1992, (pp. 44-50, 66, 70, 76, 79, 562, and 563).

R. Schuler, "How Does the Internet work," published 2002, downloaded from https://web.stanford.edu/class/msande91si/www-spr04/readings/week1/InternetWhitepaper.htm (Year: 2002); 5 pages.

(56) References Cited

OTHER PUBLICATIONS

Rekimoto, et al., CyberCode: Designing Augmented Reality Environments with Visual Tags, Interaction Laboratory, Sony Computer Science Laboratories, Inc. Mar. 14, 2013, retrieved from the Internet http://citeseerx.ist.psu.edu/viewdoc/download?doi=10.1.1.37.126&rep=rep1&type=pdf (10 pages).

Roma: Interactive Fabrication with Augmented Reality and a Robotic Printer, YouTube video, published Feb. 11, 2018, downloaded from https://www.youtube.com/watch?time_continue=148&v=K_wWuYD1Fkg&feature=emb_logo (Year: 2018) 1 page.

Woodrow Barfield, Fundamentals of Wearable Computers and Augmented Reality, Second Edition (p. ix). CRC Press. Kindle Edition. Chapel Hill, North Carolina, Jul. 29, 2015, (pp. 59, 60, 195, 196, 227).

SYSTEMS AND METHODS FOR UTILIZING A LIVING ENTITY AS A MARKER FOR AUGMENTED REALITY CONTENT

FIELD OF THE INVENTION

The systems and methods described herein relate to presenting virtual content in an augmented reality environment.

BACKGROUND

Augmented reality environments may be used to present virtual content to users as if it were present in the real world.

SUMMARY

The systems and methods described herein may facilitate the rendering of virtual content in an augmented reality environment based on living entities serving as markers for the virtual content. An augmented reality environment may include views of images forming virtual content superimposed over views of the real world. Virtual content may be rendered by a display device in an augmented reality environment based on the field of view seen through the display device. The virtual content may comprise objects, surfaces, textures, effects, and/or other content visibly manifested in views of the augmented reality environment. In some implementations, virtual content may comprise an avatar and/or other full- or partial-body virtual content object depicted based on the living entity. In various implementations, a living entity and multiple linkage points for the living entity may be detected within the field of view of a user. Based on the arrangement of the linkage points, virtual content may be rendered and appear superimposed over or in conjunction with a view of the living entity in the augmented reality environment. In some implementations, the rendering of virtual content in the augmented reality environment may be triggered by the arrangement of the multiple linkage points for a given living entity. For example, the arrangement of the multiple linkage points may indicate a state or action of the living entity at a given time. Virtual content may be rendered in the augmented reality environment based on the state or action of the living entity.

In various implementations, the system described herein may be configured to render virtual content in an augmented reality environment based on a living entity, in accordance with one or more implementations. The system may include one or more of an interface, one or more physical processors, electronic storage, a display device, an imaging sensor, and/or other components.

The one or more physical processors may be configured by computer-readable instructions. Executing the computer-readable instructions may cause the one or more physical processors to render virtual content in an augmented reality environment based on living entities serving as markers for the virtual content. The computer-readable instructions may include one or more computer program components. The computer program components may include one or more of a user interface component, a content management component, a content triggering component, an image generation component, a display control component, and/or other computer program components. The one or more physical processors may be physically located within a user device and/or within any of the other components of the system. For example, the user device may comprise the display device and/or be communicatively coupled to the display device.

The one or more physical processors may represent processing functionality of multiple components of the system operating in coordination. Therefore, the various processing functionality described in relation to the one or more processors may be performed by a single component or by multiple components of the system.

The content management component may be configured to manage virtual content to be rendered in an augmented reality environment. For example, the content management component may be configured to obtain, download, upload, modify, remove, and/or otherwise manage information stored and/or accessible by the system. The information may include virtual content information. Virtual content information may define virtual content (or a set of virtual content), a reference frame of the virtual content, a correlation between the reference frame of the virtual content and one or more linkage points defined with respect to a living entity (i.e., the arrangement of the multiple linkage points), and/or other information related to the virtual content. The linkage points may serve as an anchor for the reference frame of virtual content. As such, when rendered in an augmented reality environment by the display device, the virtual content may appear within a user's field of view based on how the reference frame of the virtual content is correlated to the real world by virtue of the position of the linkage points in the real world. In various implementations, the virtual content information may comprise triggering information for virtual content (e.g., a virtual content item or a set of virtual content). For example, the triggering information may indicate an arrangement of linkage points defined with respect to a living entity, a state of a living entity, and/or an action of a living entity that prompt virtual content to be rendered in the augmented reality environment when the arrangement of linkage points, state of the living entity, and/or action of the living entity is detected and/or identified.

The content management component may be configured to obtain virtual content information. For example, the content management component may be configured to obtain virtual content information from electronic storage, from one or more devices of the user, one or more connected devices (e.g., a device of a living entity visible within a field of view of the user), and/or via a network (e.g., via the Internet, cloud storage, and/or one or more other networks). In various implementations, the content management component may be configured to receive an indication of an arrangement of linkage points, a particular state of a living entity, and/or a particular action of a living entity and obtain corresponding virtual content information.

The content triggering component may be configured to trigger images of virtual content to be rendered in an augmented reality environment. In various implementations, the content triggering component may be configured to detect a living entity and multiple linkage points for the living entity visible within the field of view of a user. For example, the content triggering component may be configured to detect a living entity and one or more linkage points for the living entity visible within the field of view of a user based on a transponder of the living entity. Based on the arrangement of the linkage points, the content triggering component may be configured to cause the content management component to obtain virtual content information defining particular virtual content that is to be displayed when the arrangement is present and cause the image generation component to generate an image of the particular virtual content to be displayed in the augmented reality environment.

In some implementations, the content triggering component may be configured to trigger images of virtual content to be rendered in an augmented reality environment based on information received from a living entity. For example, the content triggering component may be configured to receive triggering information from a transponder of the living entity, a wearable device of the living entity (e.g., a visor or glasses in the case of a human and/or a collar in the case of an animal), a user device (e.g., a smart phone), and/or other device of the living entity. In some implementations, the triggering information received from the living entity may cause virtual content unique to the living entity to be rendered in an augmented reality environment. For example, the triggering information may be provided with, or prompt the content management component to obtain, virtual content information defining virtual content to be displayed based on the living entity (e.g., virtual content information defining virtual content unique to the living entity). In some implementations, the living entity and/or another user associated with the living entity may specify the virtual content to be displayed based on the living entity. In other words, the living entity may choose which virtual content is to be displayed or superimposed an image of them via the display device of the user.

The linkage points associated with a living entity may serve as an anchor for the reference frame of virtual content. As such, the position of the linkage points in the real world may define the reference frame of virtual content with respect to the real world. In some implementations, the linkage points may be defined with respect to the living entity. In some implementations, the linkage points may be located on one or more items worn by and/or affixed to the living entity. For example, one or more linkage points may be defined with respect to a device (e.g., a visor or glasses) or item (e.g., jacket or collar) worn by the living entity. The linkage points may be defined by one or more body parts of the living entity.

The content triggering component may be configured to utilize one or more image recognition techniques to detect a living entity and one or more linkage points for the living entity visible within the field of view of the user. For example, the content triggering component may be configured to detect a living entity visible within the field of view of the user by comparing a first image of the series of images captured at a first point in time and a second image of the series of images captured at a second point in time. In some implementations, the content triggering component may be configured to detect a living entity within a proximity of the user based on audio information received by the system. For example, audio information received may indicate the presence of a living entity within a proximity of the user, location information for the living entity, and/or other information of the living entity. The content triggering component may be configured to detect linkage points for the living entity visible within the field of view using facial and/or body recognition techniques, by identifying one or more body parts of the living entity, by detecting clothing or items worn by living entity configured to serve as linkage points for virtual content, by detecting one or more specific colors or sound patterns, and/or using one or more other image recognition techniques capable of detecting linkage points for the living entity visible within the field of view of a user.

The content triggering component may be configured to determine an arrangement of the linkage points detected for a given living entity. The arrangement of linkage points may define the position of the linkage points in relation to one another. In other words, the arrangement of the linkage points may define the relative position of each of the linkage points. In some implementations, the content triggering component may be configured to determine an arrangement of the linkage points detected for each of the multiple living entities simultaneously. In some implementations, the content triggering component may be configured to trigger images of virtual content to be rendered in an augmented reality environment based on the arrangement of the linkage points defined with respect to the living entity. The virtual content information obtained may define the virtual content item to be displayed when the arrangement is present, in addition to at least a correlation between the arrangement and a reference frame of the virtual content item.

The content triggering component may be configured to identify a state of the living entity or an action of the living entity based on the arrangement of the linkage points at one or more points in time. A state of a living entity may refer to the physical state of the living entity at a given point in time. For example, the state of a living entity may be standing, sitting, laying down, and/or one or more other current physical states of the living entity. An action of a living entity may refer to a physical action of the living entity at a given time. For example, the action of a living entity may be running, standing up, sitting down, walking, jumping, acts of intimacy, and/or one or more other actions of the living entity. In some implementations, the content triggering component may trigger images of virtual content to be rendered in an augmented reality environment based on the identified state or action of the living entity.

The content triggering component may be configured to identify the living entity. The identification of the living entity may comprise identification of a specific living entity (i.e., a specific user and/or specific pet), a type of living entity (e.g., a specific species, a specific subset of a species, and/or other type of living entity), a predefined group of living entities (e.g., family, friends, co-workers, and/or other group of living entities associated with the user), and/or other one or more other identifications of the living entity. Each living entity, type of living entity, and/or group of living entities may be associated with specific virtual content. In some implementations, the content triggering component may trigger images of virtual content to be rendered in an augmented reality environment based on the identification of the living entity.

The image generation component may be configured to generate an image of virtual content to be displayed in an augmented reality environment. In various implementations, the image generation component may be configured to generate an image of virtual content to be displayed in an augmented reality environment based at least on a user's field of view and virtual content information (i.e., information defining at least the virtual content and a reference frame of the virtual content).

A user's field of view may be defined based on orientation information, location information, and/or other information. The orientation information may define an orientation of the display device. For example, the orientation of display device may be defined by one or more of a pitch angle, a roll angle, a yaw angle, and/or other measurements. When looking through the display device, the orientation of display device may indicate the direction of a user's gaze. The location information may identify a physical location of the display device. By determining the direction of a user's gaze and the user's physical position in the real world, a user's field of view may be determined.

The image generation component may be configured to generate an image of virtual content to be displayed in the augmented reality environment based on the arrangement of linkage points. That is, the image generation component may be configured to generate an image of virtual content based on a correlation between linkage points and the reference frame of the virtual content. In some implementations, the image generation component may be configured to generate an image of virtual content based on the size of the arrangement of the multiple linkage points within the field of view of the user and/or the distance of the living entity from the user. The image generation component may be configured to automatically generate images of the virtual content as a user's field of view changes or as a living entity moves within a user's field of view, thus changing the depiction of the virtual content in the augmented reality environment based on the reference frame of the virtual content and its correlation to the position of the linkage points.

The display control component may be configured to cause an image generated by image generation component to be displayed in an augmented reality environment via a display device. The display control component may be configured to effectuate transmission of instructions to the display device to cause the image to be displayed. Images of virtual content generated by image generation component may be presented via a display device in conjunction with the real world so that the virtual content appears as if it exists in the real world. The display control component may be configured to cause updated images of virtual content to be displayed in the augmented reality environment via a display device in real-time.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

This disclosure relates to systems and methods for utilizing living entities as markers for virtual content in an augmented reality environment, in accordance with one or more implementations. Virtual content may refer to one or more virtual content items. A virtual content item may comprise a two- or three-dimensional virtual image of an object, a part of an object, a surface, a texture, an effect, and/or other content visibly manifested in views of the augmented reality environment. In some implementations, virtual content may comprise an avatar and/or other full- or partial-body virtual content object depicted based on the living entity. The living entities used as a marker by the systems and methods disclosed herein may be human and/or of one or more other species (e.g., a dog, a cat, and/or one or more other species). Virtual content may be rendered by a display device in an augmented reality environment based on the field of view seen through the display device and a position of linkage points of the living entity in the real world.

In some implementations, the techniques described herein may be used to render virtual content in an augmented reality environment based on the user. That is, a display device of a user may render virtual content based on one or more living entities within field of view of the user while the user and/or the one or more living entities simultaneously visualize virtual content based on the user. In other words, the techniques described herein may be used by individual users to view virtual content depicted in association with or superimposed over both themselves and one or more living entities within their field of view. For example, the techniques described herein may enable a user to look down at their own hand and see virtual content superimposed over their hand based on the detection of linkage points of the hand and virtual content information defining virtual content to be rendered over the hand.

It will be appreciated by those having skill in the art that the implementations described herein may be practiced without these specific details or with an equivalent arrangement. In other instances, well-known structures and devices are shown in block diagram form in order to avoid unnecessarily obscuring the implementations of the invention.

Exemplary System Architecture

Figure 1:
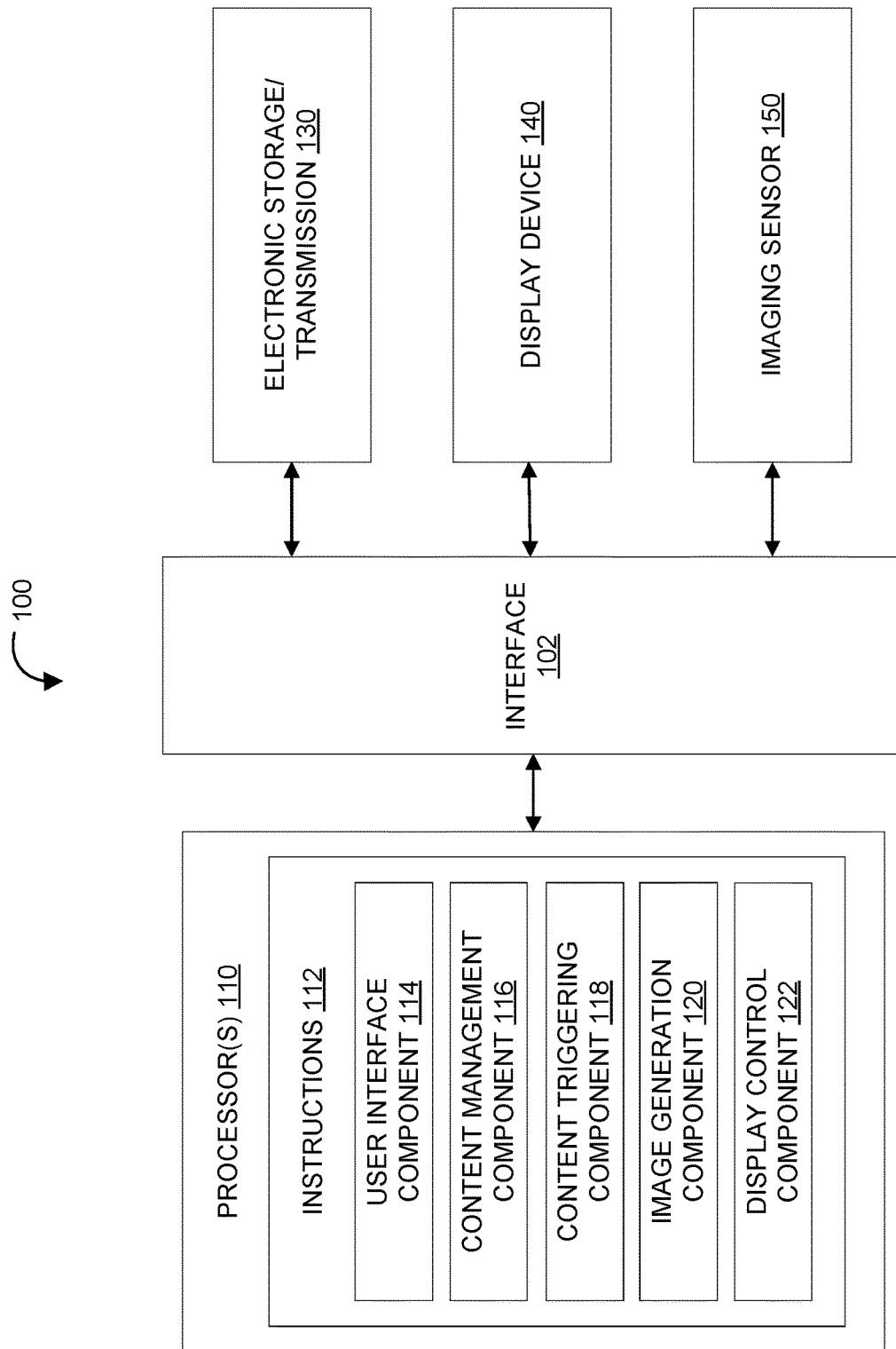
FIG. 1 illustrates a system for rendering a virtual content object in an augmented reality environment based on a living entity, in accordance with one or more implementations.

FIG. 1 illustrates a system 100 for rendering a virtual content object in an augmented reality environment based on a living entity, in accordance with one or more implementations. The system may include one or more of interface 102, one or more physical processors 110, electronic storage 130, display device 140, imaging sensor 150, and/or other components.

The one or more physical processors 110 (also interchangeably referred to herein as processor(s) 110, processor 110, or processors 110 for convenience) may be configured to provide information processing capabilities in system 100. As such, the processor(s) 110 may comprise one or more of a digital processor, an analog processor, a digital circuit designed to process information, a central processing unit, a graphics processing unit, a microcontroller, an analog circuit designed to process information, a state machine, and/or other mechanisms for electronically processing information.

Processor(s) 110 may be configured to execute one or more computer readable instructions 112. Computer readable instructions 112 may include one or more computer program components. Computer readable instructions 112 may include one or more of user interface component 114, content management component 116, content triggering component 118, image generation component 120, display control component 122, and/or other computer program components. As used herein, for convenience, the various computer readable instructions 112 will be described as performing an operation, when, in fact, the various instructions program the processor(s) 110 (and therefore system 100) to perform the operation.

User interface component 114 may be configured to generate and cause a user interface to be displayed to a user. In various implementations, the user interface may be displayed to a user via a display interface of a user device. For example, a user interface may be displayed to a user via a graphical user interface of a user device, a display of display device 140, or any other display interface provided via a user device and/or a component of system 100.

In various implementations, user interface component 114 may be configured to generate a user interface that provides a user with information related to system 100. For example, the information related to the system may comprise an indication of one or more connected devices (e.g., a user device such as a smartphone or display device, and/or other devices connectable to system 100), virtual content depicted in the augmented reality environment whether currently visible or not, virtual content available to be presented via display device 140 (e.g., content available via one or more devices of a user, electronic storage 130, and/or other components of system 100), an indication of a direction in which virtual content may be visible via display device 140, an indication of one or more markers visible via display device 140, an indication of one or more living entities visible via display device 140, one or more instructions for the user to trigger the rendering of virtual content in the augmented reality environment via display device 140, an indication of one or more other users interacting with and/or viewing virtual content, a current time and/or date, and/or other information related to system 100. In some implementations, user interface component 114 may be configured to generate a user interface that provides a user with information related to system 100 without enabling the user to provide input via the user interface.

In various implementations, user interface component 114 may be configured to generate a user interface that provides a user with information related to system 100 and enables a user to provide input. For example, the user interface may comprise selectable icons, input fields, and/or other user input options enabling a user to control one or more aspects of system 100. In some implementations, user interface component 114 may be configured to generate a user interface that enables a user to request virtual content to be rendered in the augmented reality environment. In some implementations, user interface component 114 may be configured to generate a user interface that enables a user to modify virtual content information for virtual content based on one or more types of user input. For example, a user interface generated by user interface component 114 may be configured to receive requests to modify virtual content displayed via display device 140. Requests to modify virtual content may comprise requests to modify (i.e., alter) virtual content currently displayed via display device 140 and/or requests to swap out the virtual content rendered in an augmented reality environment for other virtual content. In some implementations, user interface component 114 may be configured to generate and provide to a user an interface that may receive requests to render virtual content and/or modify virtual content while virtual content is simultaneously rendered in the augmented reality environment via display device 140. In some implementations, user interface component 114 may be configured to generate a user interface that enables a user to request the removal of virtual content rendered in the augmented reality environment.

In various implementations, user interface component 114 may be configured to generate a user interface that provides an indication of the virtual content available to be presented via display device 140. Virtual content may comprise one or more virtual content items able to depicted in an augmented reality environment based on one or more reference frames. An augmented reality environment may comprise a space that represents a virtual environment that may be superimposed over a perspective of a physical real-world environment around a user. An augmented reality environment may include attributes of a virtual environment, including virtual content superimposed over portions of the physical environment. In some implementations, an augmented reality environment may represent physical objects in the physical world as virtual content in the augmented environment.

Virtual content may refer to one or more virtual content items. A virtual content item may comprise a two- or three-dimensional virtual image of an object, a part of an object, a surface, a texture, an effect, and/or other content visibly manifested in views of the augmented reality environment. For example, a virtual content item may comprise an effect (or animation) that is rendered in an augmented reality environment when a particular action of a living entity is identified (e.g., virtual spinning wheels to replace legs when it is determined that the living entity is running). In some implementations, virtual content may comprise an avatar and/or other full- or partial-body virtual content object depicted based on the living entity. Virtual content comprising an avatar and/or other full- or partial-body virtual content object may be based on an individualized texture map (or "skin") and created using a three-dimensional full body scan and/or using other techniques now known or future developed for generating three-dimensional content.

In some implementations, virtual content depicted in the augmented reality environment may comprise a set of virtual content. A set of virtual content is one or more virtual content items that share a reference frame. That is, the position, orientation, scale, and/or other parameters of the virtual content item or items in the set of virtual content can be manipulated in a coordinated way by manipulating the reference frame for the set of virtual content.

The virtual content available to be presented via display device 140 may include virtual content stored on or accessible via one or more devices of a user, electronic storage 130, and/or other components of system 100. In some implementations, user interface component 114 may be configured to provide a list of virtual content available to be presented via display device 140 obtained from content management component 116. For example, user interface component 114 may be configured to cause a selectable list of virtual content available to be presented via display device 140 to be provided to a user. The list of virtual content available to be presented via display device 140 may include virtual content stored on or accessible via one or more devices of a user, electronic storage 130, other components of system 100, virtual content available via one or more connected devices (e.g., a device of a living entity visible within a field of view of the user), and/or virtual content available via a network (e.g., obtainable via the Internet, stored in cloud storage, or otherwise available via a network). In some implementations, the list of virtual content may include an indication of a state or action of a living entity that must be identified to trigger the rendering of virtual content associated with the state or action. The state or action of the living entity may be identified by content triggering component 118 based on the arrangement of linkage points defined with respect to the living entity.

In some implementations, user interface component 114 may be configured to cause a selectable list of virtual content objects to be provided to a user via a user interface. In some implementations, user interface component 114 may be configured to receive a selection indicating virtual content to be presented via display device 140. For example, user interface component 114 may be configured to receive user input indicating a selection of one or more virtual content objects to be presented via display device 140. In some implementations, content management component 114 may be configured to store indications of particular virtual content triggered or selected to be displayed, particular virtual content triggered or selected to be displayed for specific types of living entities or specific identified living entities, particular virtual content triggered or selected to be displayed in association with a given action, particular virtual content triggered or selected to be displayed in association with a given state, particular virtual content triggered or selected to be displayed at a determined location, and/or other information indicating virtual content displayed via display device 140. In some implementations, the indications of particular virtual content triggered or selected to be displayed may be utilized in conjunction with machine learning techniques to determine virtual content to depict for a given user, for a given living entity, for a given action or state, and/or at a given location.

In some implementations, a living entity visible within a field of view of a user may be provided with a user interface that includes a selectable list of virtual content to be displayed in association with the living entity. For example, the living entity may be provided with a list of virtual content via a device of the living entity (e.g., via a smartphone or wearable device of the living entity). As such, a living entity may choose the virtual content to be displayed in association with or superimposed over their image in the augmented reality environment displayed to the user via display device 140.

In some implementations, user interface component 114 may be configured to generate a user interface that provides one or more selectable controls associated with recording, broadcasting, live streaming, and/or otherwise providing an image of an augmented reality environment to one or more other users. For example, the one or more selectable controls may enable a user to pause, stop, fast forward, rewind, and/or otherwise control a recording. In some implementations, the one or more selectable controls may enable a user to identify one or more recipients of an image of an augmented reality environment and/or establish one or more access controls associated with the image of the augmented reality environment.

Content management component 116 may be configured to manage virtual content to be rendered in an augmented reality environment. In various implementations, content management component 116 may be configured to obtain, download, upload, modify, remove, and/or otherwise manage information stored and/or accessible by system 100. Information stored and/or accessible by system 100 may include virtual content information. Virtual content information may define virtual content (or a set of virtual content), a reference frame of the virtual content, a correlation between the reference frame of the virtual content and one or more linkage points defined with respect to a living entity (i.e., the arrangement of the multiple linkage points), and/or other information related to the virtual content.

Figure 2:
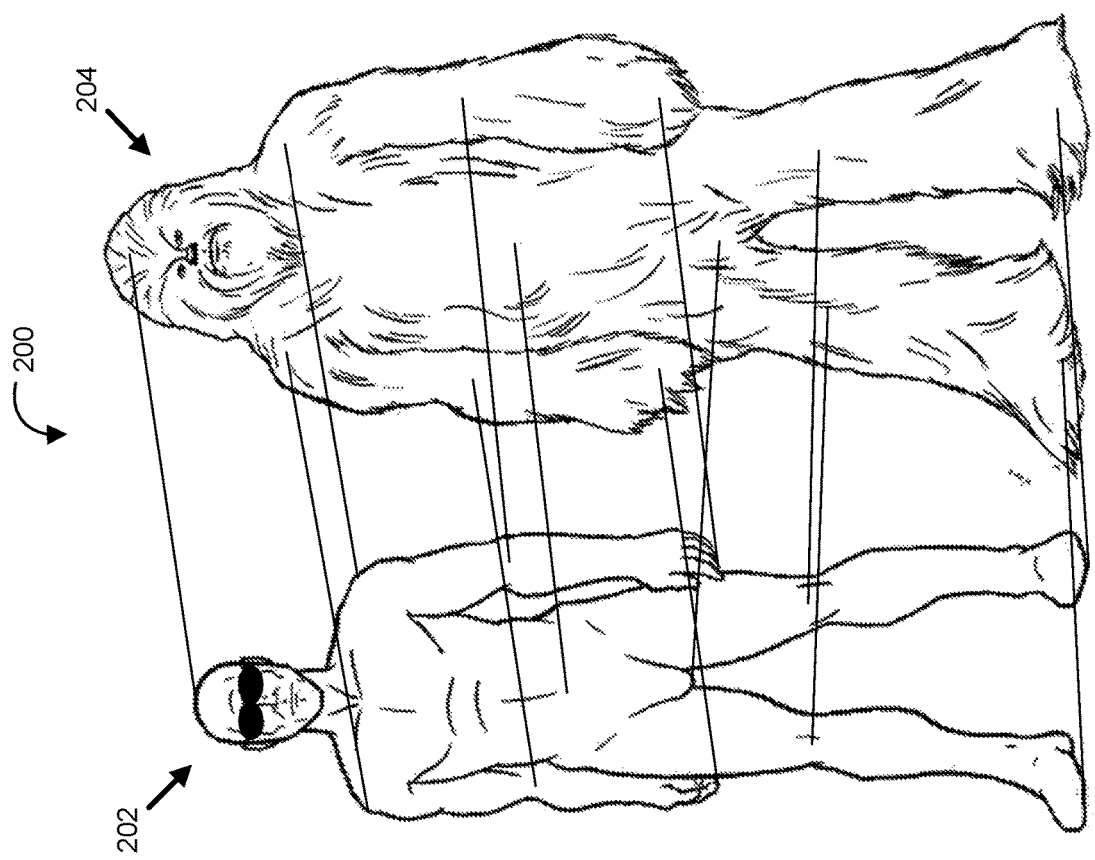
FIG. 2 illustrates an exemplary correlation between an arrangement of linkage points defined with respect to a living entity and a reference frame of a virtual content item, in accordance with one or more implementations.

For example, and referring to FIG. 2, exemplary correlation 200 between an arrangement of linkage points defined with respect to a living entity and a reference frame of a virtual content item, in accordance with one or more implementations. Exemplary correlation 200 may define how virtual content 204 may be rendered and appear superimposed over or in conjunction with a view of living entity 202 in the augmented reality environment. Particular linkage points on living entity 202 may be matched with particular predefined points on virtual content 204. A given linkage point of living entity 202 may be matched with a given point of virtual content 204 based on the arrangement of the linkage points of living entity 202 and/or based on a predefined correlation between linkage points defined with respect to particular features of living entity 202 (i.e., the head, abdomen, knees, feet, etc.) and points of virtual content 204 associated with corresponding features of a living entity. Living entity 202 is depicted wearing glasses in exemplary correlation 200. The glasses worn by living entity 202 may or may not be involved in the rendering of virtual content in an augmented reality environment by system 100, as described further below with respect to FIG. 3A and FIG. 3B.

In some implementations, the correlation between the reference frame of virtual content and the arrangement of linkage points defined with respect to a living entity may be modified. In some implementations, a user may modify the correlation between the reference frame of virtual content and the arrangement of linkage points defined with respect to a living entity. For example, a user may modify the correlation between the reference frame of virtual content and the arrangement of linkage points defined with respect to a living entity via a user interface generated by interface component 114 and presented via display device 140. For example, a user may modify the correlation between the reference frame of virtual content and the arrangement of linkage points defined with respect to a living entity as the virtual content is rendered in an augmented reality environment and displayed via display device 140. In some implementations, a user may modify the correlation between the reference frame of virtual content and the arrangement of linkage points defined with respect to a living entity in real-time. In some implementations, a user may store an image of virtual content rendered in an augmented reality environment in order to later modify the correlation between the reference of the virtual content and the arrangement of linkage points.

In some implementations, the correlation between the reference frame of virtual content and the arrangement of linkage points defined with respect to a living entity may be updated over time. For example, one or more machine learning techniques may be used to update the correlation between the reference frame of virtual content and the arrangement of linkage points defined with respect to a living entity may be updated over time. The machine learning techniques may be supervised or unsupervised. In some implementations, indications of particular arrangements of linkage points associated with one or more living entities may be obtained and stored over time. For example, indications of particular arrangements of linkage points associated with multiple living entities may be aggregated by imaging sensors (e.g., imagining sensor 150) of multiple users over time and stored, indications of particular arrangements of linkage points associated with a single living entity may be aggregated by imaging sensors (e.g., imagining sensor 150) of multiple users over time and stored, and/or indications of particular arrangements of linkage points associated with a one or more living entities may be obtained by the user via imagining sensor 150 and stored. As such, a network of users may build a database of indications of particular arrangements of linkage points for all or portion of all living entities encountered; the network of users may build a database of indications of particular arrangements of linkage points for each, or at least one specific, living entity; a single user may build a database of indications of particular arrangements of linkage points for all or portion of all living entities encountered; and/or a single user may build a database of indications of particular arrangements of linkage points for each, or at least one specific, living entity. A database of indications of particular arrangements of linkage points may be used to update correlations between a reference frame of virtual content and an arrangement of linkage points defined with respect to a living entity. For example, one or more machine learning techniques now known or future developed may be used to update correlations between a reference frame of virtual content and an arrangement of linkage points defined with respect to a living entity based on one or more databases of indications of particular arrangements of linkage points. In some implementations, the correlations between the reference frames of virtual content and an arrangement of linkage points defined with respect to a living entity may be updated to more accurately render muscle deformation, the effects of gravity, the movement or position of the body of a living entity or aspects of the body of a living entity while in different states or performing different actions, and/or other characteristics relevant to depicting life-like virtual content.

In various implementations, virtual content information may comprise multiple parameters that define virtual content to be displayed in an augmented reality environment. For example, the parameters may define a position of the virtual content when displayed in an augmented reality environment (e.g., a physical location in the real-world associated with the virtual content, a position in relation to one or more linkage points, and/or a position in relation to one or more other virtual content items), a size of the virtual content, an orientation of the virtual content with respect to a reference frame of the virtual content, one or more colors of the virtual content, a shape of the virtual content, one or more haptic features of the virtual content, one or more sounds associated with the virtual content, and/or one or more other parameters that may define how a virtual content object is rendered in an augmented reality environment. For example, parameters defining one or more animations associated with virtual content may define the nature and timing of an animation associated with the virtual content object.

In various implementations, virtual content information may comprise triggering information for virtual content (e.g., a virtual content item or a set of virtual content). For example, the virtual content information may comprise triggering information for virtual content that indicates an arrangement of linkage points defined with respect to a living entity, a state of a living entity, and/or an action of a living entity that prompt the virtual content to be rendered in the augmented reality environment when the arrangement of linkage points, state of the living entity, and/or action of the living entity is detected and/or identified by content triggering component 118. In other words, the triggering information may define a correlation between the virtual content and one or more arrangements of linkage points defined with respect to a living entity, a correlation between the virtual content and a state or action of a living entity, and/or other triggering information related to the virtual content.

In various implementations, content management component 116 may be configured to obtain virtual content information. For example, content management component 116 may be configured to obtain virtual content information from electronic storage. In some implementations, content management component 116 may be configured to obtain virtual content information stored at one or more devices of user. In some implementations, content management component 116 may be configured to obtain virtual content information from one or more connected devices (e.g., a device of a living entity visible within a field of view of the user). For example, content management component 116 may be configured to receive virtual content information from one or more connected devices (e.g., a device of a living entity visible within a field of view of the user). In some implementations, content management component 116 may be configured to receive virtual content information from one or more connected devices (e.g., a device of a living entity visible within a field of view of the user) responsive to a request for the virtual content information from the user (i.e., one or more devices of the user). In some implementations, content management component 116 may be configured to obtain virtual content information via a network (e.g., via the Internet, cloud storage, and/or one or more other networks). For example, content management component 116 may be configured to download virtual content information from the Internet or from cloud storage in response to a selection or triggering of virtual content to be displayed on display device 140.

In various implementations, content management component 116 may be configured to receive an indication of an arrangement of linkage points from content triggering component 118 and obtain virtual content information based on the arrangement. For example, content management component 116 may be configured to receive an indication of a particular arrangement of linkage points from content triggering component 118 and obtain virtual content information based on the particular arrangement and the triggering information of the virtual content information. The virtual content information obtained may define the virtual content item to be displayed when the arrangement is present and a correlation between the arrangement and a reference frame of the virtual content item.

In various implementations, content management component 116 may be configured to receive an indication of a state or action of a living entity from content triggering component 118 and obtain virtual content information based on the state or action. For example, content management component 116 may be configured to receive an indication of a particular state or action identified by content triggering component 118 and obtain virtual content information based on the particular state or action and the triggering information of the virtual content information. The virtual content information obtained may define a virtual content item to be displayed when the state or action is identified and a correlation between a reference frame of the virtual content item and linkage points defined with respect to the living entity.

In an exemplary implementation, the virtual content item to be displayed when the action is identified may comprise an animation associated with the action. For example, a stored animation depicting an Olympic sprinter running may be associated with the action "running." When it is detected that a living entity is running, system 100 may be configured to cause the stored animation to superimposed over the living entity to appear as if the user is running with the form of an Olympic sprinter. In some implementations, system 100 may use machine learning to determine virtual content to depict for a given user, for a given living entity, for a given action or state, and/or at a given location. For example, stored indications of particular virtual content triggered or selected to be displayed by a user, particular virtual content triggered or selected to be displayed for specific types of living entities or specific identified living entities, particular virtual content triggered or selected to be displayed in association with a given action, particular virtual content triggered or selected to be displayed in association with a given state, particular virtual content triggered or selected to be displayed at a determined location, and/or other information indicating virtual content displayed via display device 140 may be monitored and accessed over time to determine virtual content to depict for a given user, for a given living entity, for a given action or state, and/or at a given location.

In some implementations, content management component 116 may be configured to obtain virtual content information from a sign post. For example, in some implementations, a sign post may comprise a wirelessly connectable device linked to a power source and electronic storage. In some implementations, a device of the living entity (e.g., a smartphone, a tablet, a computer, a wearable device, and/or other user device associated with the living entity) may be a sign post configured to provide virtual content information to a device of the user. For example, a visor or glasses of a human living entity may serve as a sign post, and a collar or other wearable item of an animal/pet living entity may comprise a sign post. In some implementations, content management component 116 may be configured to obtain virtual content information from a transponder of a living entity within the field of view of a user and/or within a proximity of the user. In some implementations, content management component 116 may be configured obtain virtual content information from a sign post as described in co-pending U.S. patent application Ser. No. 15/707,854, entitled "SYSTEMS AND METHODS FOR UTILIZING A DEVICE AS A MARKER FOR AUGMENTED REALITY CONTENT," the disclosure of which is hereby incorporated by reference in its entirety herein.

In some implementations, content management component 116 may be configured to determine whether virtual content information defining virtual content is locally stored or available via a device of a user, electronic storage 130, display device 140, and/or other components of system 100. Based on a determination that the virtual content information is not available via a device of a user, electronic storage 130, display device 140, or other component of system 100, content management component 116 may be configured to download virtual content information from the Internet or from cloud storage. For example, content management component 116 may be configured to automatically download virtual content information based on a determination that the virtual content information is not available via a device of a user, electronic storage 130, display device 140, or other component of system 100. In some implementations, content management component 116 may be configured to automatically download or request virtual content information from a transponder of the living entity, a wearable device of the living entity (e.g., a visor or glasses in the case of a human and/or a collar in the case of an animal), a user device (e.g., a smart phone), and/or other device of the living entity based on a determination that the virtual content information is not available via a device of a user, electronic storage 130, display device 140, or other component of system 100. In some implementations, content management component 116 may be configured to automatically download virtual content information from the Internet or from cloud storage responsive only to a determination that the virtual content information is not available via a device of a user, electronic storage 130, display device 140, one or more other component of system 100, a transponder of the living entity, a wearable device of the living entity (e.g., a visor or glasses in the case of a human and/or a collar in the case of an animal), a user device (e.g., a smart phone), and/or other device of the living entity.

In various implementations, content management component 116 may be configured to store virtual content information. For example, content management component 116 may be configured to store virtual content information at one or more devices of a user, electronic storage 130, display device 140, and/or other storage component accessible by system 100. For example, content management component 116 may be configured to store virtual content information in cloud storage.

In some implementations, content management component 116 may be configured to generate virtual content information. Virtual content information defining virtual content may be generated using various techniques. Virtual content information may be initially generated using one or more techniques for generating three-dimensional content. In various implementations, virtual content information defining virtual content objects may be generated based on user input identifying one or more parameters. Therefore, the virtual content information may include information indicating the one or more parameters in order to define a virtual content object. In some implementations, virtual content information defining virtual content objects may be generated using three-dimensional animation techniques, using three-dimensional drawings (e.g., using computer-aided design (CAD) software), based on three-dimensional photography of real-world objects, based on still images and/or videos captured with a three-dimensional camera, using three-dimensional graphic modeling techniques, and/or using other techniques now known or future developed for generating three-dimensional content. The virtual content information may be generated automatically and/or based on user input related to the one or more techniques for generating three-dimensional content. In various implementations, virtual content information may be generated, modified, and/or otherwise produced in real-time based on user input.

Content triggering component 118 may be configured to trigger images of virtual content to be rendered in an augmented reality environment. In various implementations, content triggering component 118 may be configured to detect a living entity and multiple linkage points for the living entity visible within the field of view of a user. Based on the arrangement of the linkage points, content triggering component 118 may be configured to cause content management component 116 to obtain virtual content information defining particular virtual content that is to be displayed when the arrangement is present and cause image generation component 120 to generate an image of the particular virtual content to be displayed in the augmented reality environment. Triggering information may be used to cause an image of virtual content to be rendered in an augmented reality environment based on the detection of a living entity and multiple linkage points defined with respect to the living entity within the field of view of a user, the determination of a particular arrangement of the multiple linkage points, and/or the identification of a state or action of the living entity based on the arrangement of the multiple linkage points.

In various implementations, content triggering component 118 may be configured to detect a living entity and one or more linkage points for the living entity visible within the field of view of a user using one or more image recognition techniques, object recognition techniques, and/or body recognition techniques. In some implementations, content triggering component 118 may be configured to detect a living entity and one or more linkage points for the living entity visible within the field of view of a user based on a device of the living entity (e.g., a smartphone, a tablet, a computer, a wearable device, and/or other user device associated with the living entity). For example, content triggering component 118 may be configured to detect a living entity and one or more linkage points for the living entity visible within the field of view of a user based on a transponder of the living entity.

In various implementations, content triggering component 118 may be configured to detect a living entity and one or more linkage points for the living entity visible within the field of view of a user in real-time. In some implementations, content triggering component 118 may be configured to detect multiple living entities and multiple linkage points for each of the living entities visible within the field of view of a user simultaneously.

In various implementations, content triggering component 118 may be configured to detect a living entity and one or more linkage points for the living entity visible within the field of view of a user based on a series of images. The series of images may be obtained from imaging sensor 150. Imaging sensor 150 may be configured to generate output signals conveying a series of images depicting a field of view of the user. Content triggering component 118 may be configured to utilize one or more image recognition techniques to detect a living entity and one or more linkage points for the living entity visible within the field of view of the user based on a series of images.

In some implementations, content triggering component 118 may be configured to detect a living entity visible within the field of view of the user by comparing images within the series of images. For example, content triggering component 118 may be configured to detect a living entity visible within the field of view of the user by comparing a first image of the series of images captured at a first point in time and a second image of the series of images captured at a second point in time. In some implementations, content triggering component 118 may be configured to use one or more image recognition techniques, object recognition techniques, and/or body recognition techniques to detect a living entity visible within a field of view of a user when comparing a first image of the series of images captured at a first point in time and a second image of the series of images captured at a second point in time. Based on the comparison of the first image and the second image, content triggering component 118 may be configured to detect a living entity visible within the field of view of the user.

In some implementations, content triggering component 118 may be configured to utilize one or more other image recognition techniques to detect a living entity visible within the field of view of the user. In some implementations, content triggering component 118 may be configured to detect a living entity using facial recognition or body recognition. In some implementations, content triggering component 118 may be configured to detect a living entity based on the establishment of wireless communication between a user device, display device 140, and/or other component of system 100 with a device of the living entity (e.g., a smartphone, a tablet, a computer, a wearable device, and/or other user device associated with the living entity). For example, content triggering component 118 may be configured to detect a living entity based on the establishment of wireless communication between a user device, display device 140, and/or other component of system 100 with a device of the living entity on which an application associated with system 100 is downloaded. In some implementations, content triggering component 118 may be configured to detect a living entity based on a determination that a device of the living entity is within a geographic proximity of a user device, display device 140, and/or other component of system 100.

In some implementations, content triggering component 118 may be configured to detect a living entity within a proximity of the user based on audio information received by a user device, display device 140, and/or other component of system 100. For example, audio information received may indicate the presence of a living entity within a proximity of the user, location information for the living entity, and/or other information of the living entity. The audio information may comprise a sound that is associated with the living entity. For example, the audio information may be detected based on an audio signal received via system 100. Audio information may be obtained from the received audio signal. In some implementations, the audio information may be associated with a predefined living entity (i.e., a specific user and/or specific pet), a predefined type of living entity (e.g., a specific species, a specific subset of a species, and/or other type of living entity), a predefined group of living entities (e.g., family, friends, co-workers, and/or other group of living entities associated with the user).

In some implementations, content triggering component 118 may be configured to detect a living entity visible within the field of view of a user and/or within a proximity of the user based on a transponder of the living entity. For example, content triggering component 118 may be configured to detect a living entity by recognizing a transponder associated with one or more living entities. For example, a device of the living entity may comprise a transponder. In some implementations, a transponder may be located on or within one or more items worn and/or affixed to the living entity. For example, a transponder may be located on or within clothing, jewelry, a wearable pet item, and/or other item worn and/or affixed to the living entity. A transponder may comprise a device configured to emit a signal that contains virtual content information, triggering information, and/or other information used by system 100 to present virtual content in an augmented reality environment. For example, a transponder of a living entity may be configured to emit a signal that contains identification information for a living entity, virtual content information defining virtual content to be displayed based on the living entity (e.g., virtual content information defining virtual content unique to the living entity), location information for the living entity, linkage point information for one or more linkage points located on and/or generated by the transponder, and/or triggering information for virtual content to be displayed based on the living entity. In some implementations, a transponder of a living entity may only emit a signal containing information used by system 100 to present virtual content in an augmented reality environment in response to receipt of a signal emitted by system 100. For example, a user device, display device 140, and/or other component of system 100 may emit a signal that prompts a transponder of a living entity to provide information that facilitates the detection of a living entity visible within the field of view of the user and/or within a proximity of the user.

In some implementations, content triggering component 118 may be configured to receive a signal from a transponder of a living entity. The signal may indicate an identification of a living entity, or include identification information for a living entity, visible within a field of view of a user and/or with a proximity of the user. Based on the identification of the living entity or identification information for the living entity, content triggering component 118 may be configured to obtain virtual content information from content management component 116. For example, content management component 116 may search for virtual content associated with the identification information (or identified living entity) stored on or accessible via one or more devices of a user, electronic storage 130, other components of system 100, virtual content available via one or more connected devices (e.g., a device of a living entity visible within a field of view of the user), and/or virtual content available via a network (e.g., obtainable via the Internet, stored in cloud storage, or otherwise available via a network). Based on the received signal, content triggering component 118 may be configured to trigger virtual content to be rendered based on virtual content information obtained based on the identification information (or identified living entity).

In various implementations, content triggering component 118 may be configured to trigger images of virtual content to be rendered in an augmented reality environment based on information received from a living entity. For example. content triggering component 118 may be configured to receive triggering information from a transponder of the living entity, a wearable device of the living entity (e.g., a visor or glasses in the case of a human and/or a collar in the case of an animal), a user device (e.g., a smart phone), and/or other device of the living entity. The triggering information received from the living entity may cause an image of virtual content to be rendered in an augmented reality environment based on living entity and multiple linkage points defined with respect to the living entity within the field of view of a user. In some implementations, triggering information received from a living entity may cause an image of virtual content to be rendered in an augmented reality environment based on the determination of a particular arrangement of the multiple linkage points defined with respect to the living entity and/or the identification of a state or action of the living entity based on the arrangement of the multiple linkage points. In some implementations, content triggering component 118 may be configured to trigger virtual content unique to a living entity visible within a field of view of the user to be rendered in an augmented reality environment based on triggering information received from the living entity. For example, the triggering information may be provided with virtual content information defining virtual content to be displayed based on the living entity (e.g., virtual content information defining virtual content unique to the living entity) and/or prompt content management component 116 to obtain virtual content information defining virtual content to be displayed based on the living entity (e.g., virtual content information defining virtual content unique to the living entity).

In various implementations, content triggering component 118 may be configured to detect linkage points for the living entity visible within the field of view of a user. The linkage points may comprise indicators, transponders, stitching points, and/or other identified points. The linkage points associated with a living entity may serve as an anchor for the reference frame of virtual content. As such, the position of the linkage points in the real world may define the reference frame of virtual content with respect to the real world. For example, a set of multiple linkage points may serve as an anchor for the reference frame of virtual content by orienting the virtual content based on a correlation between the reference frame of the virtual content and the arrangement of the set of linkage points. In various implementations, the space between each of the set of linkage points and/or the arrangement of the set of linkage points may provide information as to orientation, size, and direction of virtual content.

In various implementations, the linkage points may be defined with respect to the living entity. In some implementations, one or more linkage points may be located on and/or generated by one or more devices of the living entity. For example, a linkage point may be located on and/or generated by a transponder of the living entity, a wearable device of the living entity (e.g., a visor or glasses in the case of a human and/or a collar in the case of an animal), a user device (e.g., a smart phone), and/or other device of the living entity. In some implementations, one or more linkage points may be located on and/or generated by a transponder of a living entity. For example, a transponder or other device of a user (e.g., a visor, glasses, or other wearable device) may serve as at least one linkage point of a living entity. That is, the at least one linkage point for a wearable device (e.g., an AR headset) worn by a human may serve as at least one linkage point, and a dog collar with a transponder worn by a dog may serve as at least one linkage point. A transponder or other device of a user serving as a linkage point may be predefined as a specific linkage point. In some implementations, linkage point information received via a signal transmitted by the transponder may indicate a position of the linkage point established by the transponder with respect to the living entity. In other words, a transponder or other device of a user serving as a linkage point may be predefined as a specific linkage point correlated to a specific portion of virtual content. That is, the specific linkage point may be associated with a predefined position on the body of the living entity. For example, the at least one linkage point for a wearable device (e.g., an AR headset) worn by a human may serve as a linkage point on the head of the living entity, and a dog collar with a transponder worn by a dog may serve as a linkage point on the neck of a dog. As such, content triggering component 118 may be configured to detect the at least one linkage point defined based on a transponder or other device of a user (e.g., a visor, glasses, or other wearable device) and identify the at least one linkage point as a specific linkage point. Based on the at least one linkage point defined with respect to a transponder or other device of a user, content triggering component 118 may be configured to detect and identify one or more other linkage points using one or more image recognition techniques, object recognition techniques, and/or body recognition techniques. The at least one linkage point defined with respect to a transponder or other device of a user and the one or more other linkage points detected and identified using one or more image recognition techniques, object recognition techniques, and/or body recognition techniques may comprise a set of linkage points, and content triggering component 118 may be configured to determine an arrangement of the set of linkage points.

In some implementations, the linkage points may be located on one or more articles of clothing worn by the living entity. For example, the linkage points may be located on and/or comprise high visibility clothing (e.g., ANSI Class II or ANSI Class III jacket, vest, or other clothing) and/or clothing including reflective material affixed to the front and/or back of the living entity (e.g., reflective strips positioned in a distinctive pattern, reflective material depicting a specific logo or symbol, and/or other reflective material). In some implementations, the linkage points may be located on and/or comprise one or more items worn and/or affixed to the living entity. For example, the linkage points may be located on and/or comprise reflective tape strips affixed to the living entity, marker medallions or other jewelry, and/or other items configured to be used to provide linkage points associated with the living entity. The marker medallions or other jewelry may include a pattern formed by an LED grid. In an exemplary implementation in which a living entity visible within the field of view of a user comprises an animal, the linkage points may be located on and/or generated by a collar, a wearable pet item, and/or one or more other animal accessories worn by or affixed to the animal. In some implementations, an IR camera may be used to identify linkage points located and/or comprising medallions or other jewelry that includes a pattern formed by an LED grid. Display device 140 and/or imaging sensor 150 may comprise or be physically located in an IR camera capable of identifying linkage points located and/or comprising medallions or other jewelry that includes a pattern formed by an LED grid.

In some implementations, the linkage points may be defined by one or more body parts of the living entity. For example, one or more significant body parts may serve as linkage points for content. Significant body parts may include the living entity's head or face, end points of the living entity's body (e.g., top of head, end of fingers, bottom of feet, end of torso, and/or other end points of the living entity's body), and/or one or more other significant body parts. In some implementations, content triggering component 118 may be configured to detect linkage points defined by one or more body parts of the living entity using one or more image recognition techniques, object recognition techniques, and/or body recognition techniques.

In some implementations, the linkage points may be defined by a standardized linkage point. For example, a standardized linkage point may comprise a specific geometric shape, such as a "+" which would provide information associated with the linkage point. In various implementations, multiple linkage points, each defined by a standardized linkage points, may serve as an anchor for the reference frame of virtual content (i.e., orient the virtual content based on a correlation between the reference frame of the virtual content and the arrangement of the multiple linkage points). For example, in some implementations, at least 2 or 3 linkage points may collectively serve as an anchor for the reference frame of virtual content. Information associated with the linkage point may comprise an indication of a correlation between the linkage point and a reference frame of virtual content to be displayed in the augmented reality environment based on at least that linkage point.

In some implementations, the linkage points may be defined by one or more specific colors. For example, the linkage points may be defined by predefined colors associated with one or more specific linkage points to be synchronized with one or more points of virtual content. The specific colors may be colors outside the visible spectrum for human beings. In some implementations, the linkage points may be defined by one or more specific sound patterns. For example, the linkage points may be defined by predefined sound patterns associated with one or more specific linkage points to be synchronized with one or more points of virtual content. The specific sound patterns may be sounds of a unique pitch or pattern (e.g., sounds inaudible to humans). In some implementations, content triggering component 118 may be configured to detect linkage points defined by one or more specific colors or sound patterns using display device 140, imaging sensor 150, and/or one or more other sensors of display device 140.

In some implementations, linkage points may be defined by LED or infrared-based images or patterns. In some implementations, an IR camera and/or IR sensor may be used to identify linkage points defined by LED or infrared-based images or patterns. Display device 140 and/or imaging sensor 150 may comprise or be physically located in an IR camera capable of identifying linkage points defined by LED or infrared-based images or patterns.

In various implementations, content triggering component 118 may be configured to detect linkage points for the living entity visible within the field of view of a user based on a series of images. The series of images may be obtained from imaging sensor 150. In some implementations, content triggering component 118 may be configured to detect linkage points for the living entity visible within the field of view using facial and/or body recognition techniques, by identifying one or more body parts of the living entity, by detecting clothing or items worn by living entity configured to serve as linkage points for virtual content, by detecting one or more specific colors or sound patterns, and/or using one or more other image recognition techniques capable of detecting linkage points for the living entity visible within the field of view of a user.

In various implementations, content triggering component 118 may be configured to determine an arrangement of the linkage points detected for a given living entity. The arrangement of linkage points may define the position of the linkage points in relation to one another. In other words, the arrangement of the linkage points may define the relative position of the linkage points to each other. In some implementations, content triggering component 118 may be configured to determine an arrangement of the linkage points detected for a given living entity based on a series of images. The series of images may be obtained from imaging sensor 150. For example, content triggering component 118 may be configured to determine a first arrangement of the linkage points based on a first image of the series of images captured at a first point in time and a second arrangement of the linkage points based on a second image of the series of images captured at a second point in time. In some implementations, content triggering component 118 may be configured to determine an arrangement of the linkage points detected for each of multiple living entities simultaneously.

In various implementations, content triggering component 118 may be configured to trigger images of virtual content to be rendered in an augmented reality environment based on the arrangement of the linkage points defined with respect to the living entity. Based on the arrangement of the linkage points, content triggering component 118 may be configured to cause content management component 116 to obtain virtual content information defining particular virtual content that is to be displayed when the arrangement is present and cause image generation component 120 to generate an image of the particular virtual content to be displayed in the augmented reality environment. For example, content triggering component 118 may be configured to provide an indication to content management component 116 of a particular arrangement determined for a living entity and cause content management 116 to obtain virtual content information based on the indication of the particular arrangement and the triggering information of the virtual content information. The virtual content information obtained may define the virtual content item to be displayed when the arrangement is present and a correlation between the arrangement and a reference frame of the virtual content item. Based on the virtual content information obtained, content triggering component 118 may be configured to provide instructions to image generation component 120 to generate an image of the virtual content to be displayed in an augmented reality environment based on the virtual content information obtained via content management component 116. In some implementations, content triggering component 118 may be configured to trigger images of virtual content to be rendered in an augmented reality environment based on multiple living entities simultaneously.

Figure 3A:
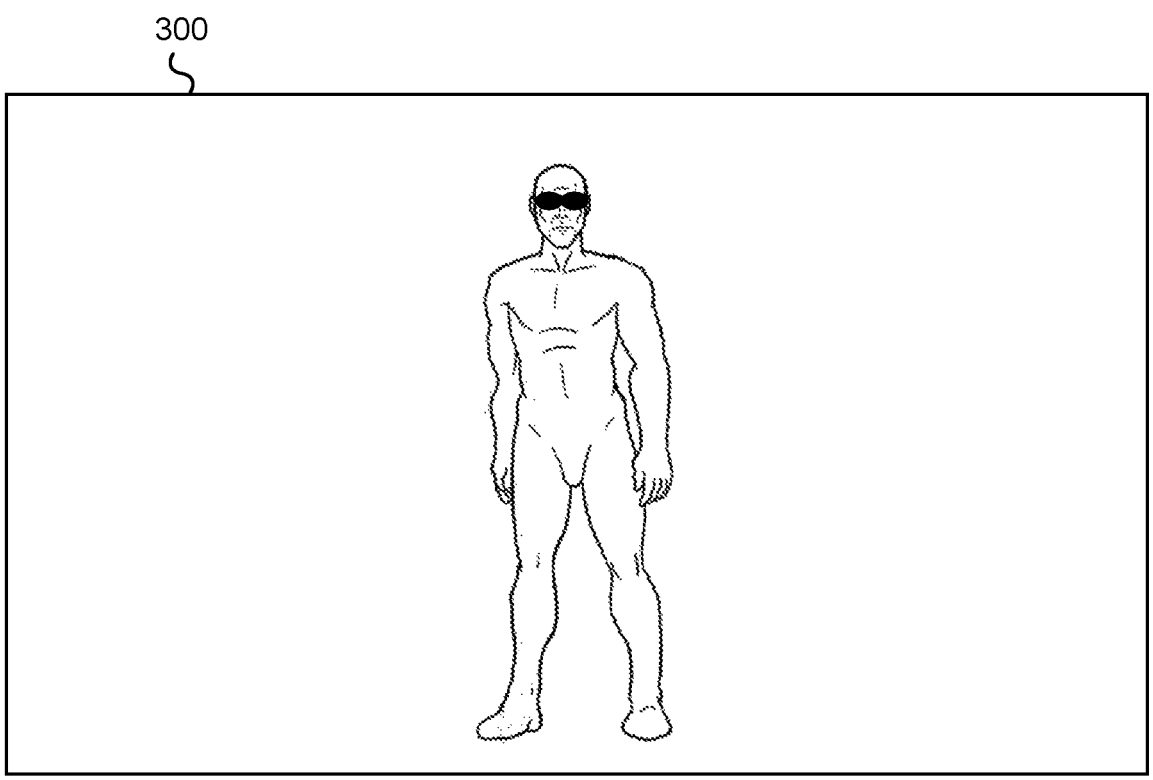
FIG. 3A and FIG. 3B illustrate exemplary displays of an augmented reality environment including virtual content rendered based on a living entity, in accordance with one or more implementations.
Figure 3B:
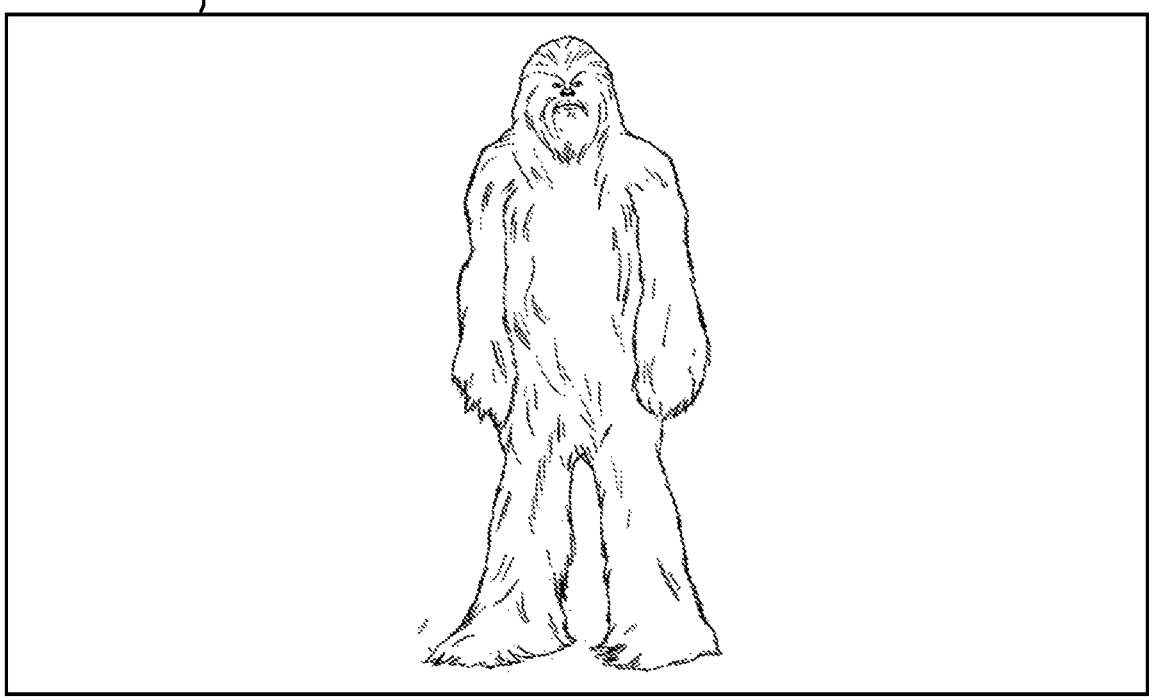

For example, and referring to FIG. 3A, exemplary display 300 of an augmented reality environment is illustrated, in accordance with one or more implementations. Exemplary display 300 may include a view of a living entity. For example, exemplary display 300 may illustrate a view of a living entity via display device 140. In various implementations, content triggering component 118 may be configured to detect the living entity and multiple linkage points for the living entity visible within the field of view of a user. For example, exemplary display 300 may comprise one of a series of images depicting a field of view of the user, and content triggering component 118 may be configured to detect the living entity and multiple linkage points for the living entity visible within the field of view of a user based on the series of images. Content triggering component 118 may be configured to determine an arrangement of the linkage points detected for the living entity visible within the field of view of a user depicted by exemplary display 300. Based on the arrangement of the linkage points, content triggering component 118 may be configured to provide instructions to image generation component 120 to generate an image of virtual content to be displayed in the augmented reality environment, as discussed below with respect to FIG. 3B.

Exemplary display 300 includes a view of a living entity wearing glasses. The glasses worn by the living entity in exemplary display 300 may or may not be involved in the rendering of virtual content in the augmented reality environment by system 100. In various implementations, the glasses worn by the living entity may be unrelated to the rendering of virtual content by system 100. However, in some implementations, the glasses worn by the living entity may include a transponder and/or comprise a wearable device of the living entity. In some implementations, the glasses worn by the living entity may generate and/or serve as one or more linkage points of the living entity, provide virtual content information, provide triggering information, and/or otherwise interact with system 100 to facilitate the rendering of the virtual content as depicted in the exemplary display 302 of the augmented reality environment.

In various implementations, content triggering component 118 may be configured to identify a state of the living entity or an action of the living entity based on the arrangement of the linkage points at one or more points in time. A state of a living entity may refer to the physical state of the living entity at a given point in time. For example, the state of a living entity may be standing, sitting, laying down, and/or one or more other current physical states of the living entity. An action of a living entity may refer to a physical action of the living entity at a given time. For example, the action of a living entity may be running, standing up, sitting down, walking, jumping, acts of intimacy, and/or one or more other actions of the living entity. In various implementations, content triggering component 118 may be configured to identify an action of the living entity based on the arrangement over a period of time. For example, content triggering component 118 may be configured to identify an action of the living entity based on a first arrangement of the linkage points at a first point in time and a second arrangement of the linkage points at a second point in time. In some implementations, content triggering component 118 may access a database comprising information indicating arrangements of linkage points and corresponding states or actions. In some implementations, content triggering component 118 may be configured to identify a state of the living entity or an action of the living entity based on the arrangement of the linkage points at a given time and information indicating a corresponding state or action to the arrangement. In some implementations, content triggering component 118 may be configured to identify a state of multiple living entities or an action of multiple living entities simultaneously.

In various implementations, content triggering component 118 may trigger images of virtual content to be rendered in an augmented reality environment based on the identified state or action of the living entity. Based on the state or action of the living entity, content triggering component 118 may be configured to cause content management component 116 to obtain virtual content information defining particular virtual content that is to be displayed when the state or action of the living entity is identified and cause image generation component 120 to generate an image of the particular virtual content to be displayed in the augmented reality environment. For example, content triggering component 118 may be configured to provide an indication to content management component 116 of a particular state or action identified for a living entity and cause content management 116 to obtain virtual content information based on the indication of the particular state or action and the triggering information of the virtual content information. The virtual content information obtained may define the virtual content item to be displayed when the state or action is identified. Based on the virtual content information obtained, content triggering component 118 may be configured to provide instructions to image generation component 120 to generate an image of the virtual content to be displayed in an augmented reality environment based on the virtual content information obtained via content management component 116.

Figure 4A:
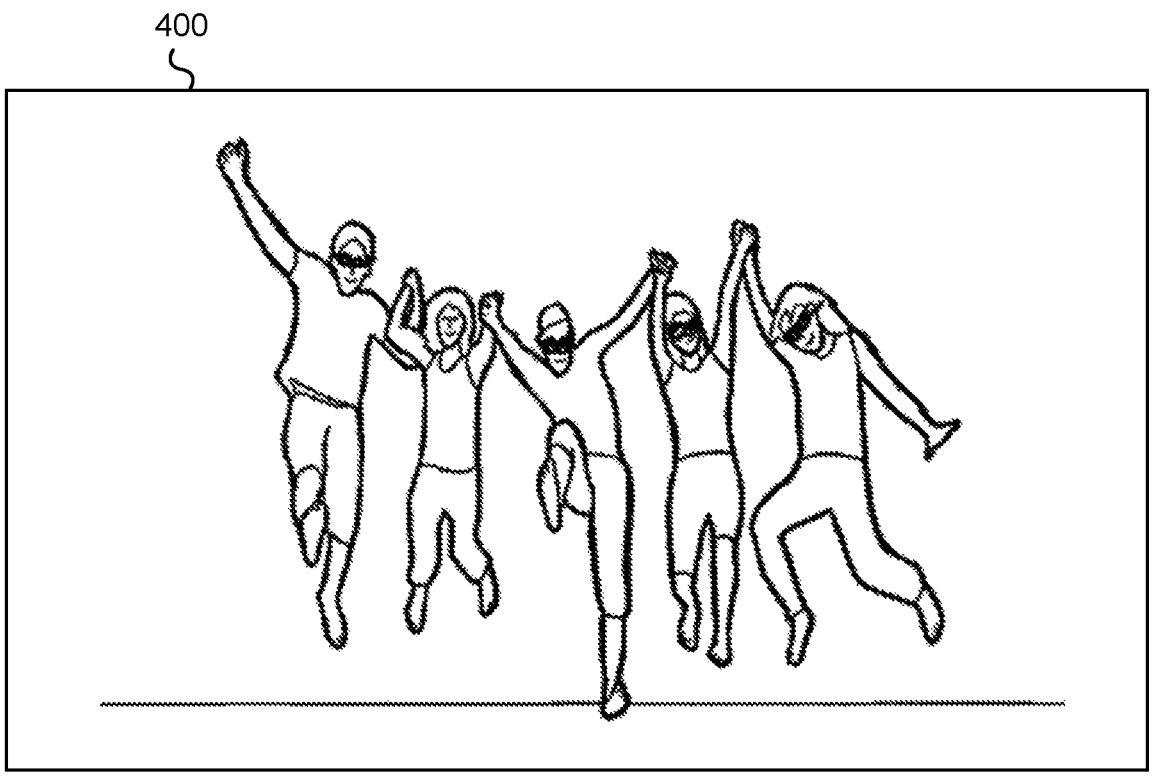
FIG. 4A and FIG. 4B illustrate exemplary displays of an augmented reality environment including virtual content rendered based on multiple living entities simultaneously, in accordance with one or more implementations.
Figure 4B:
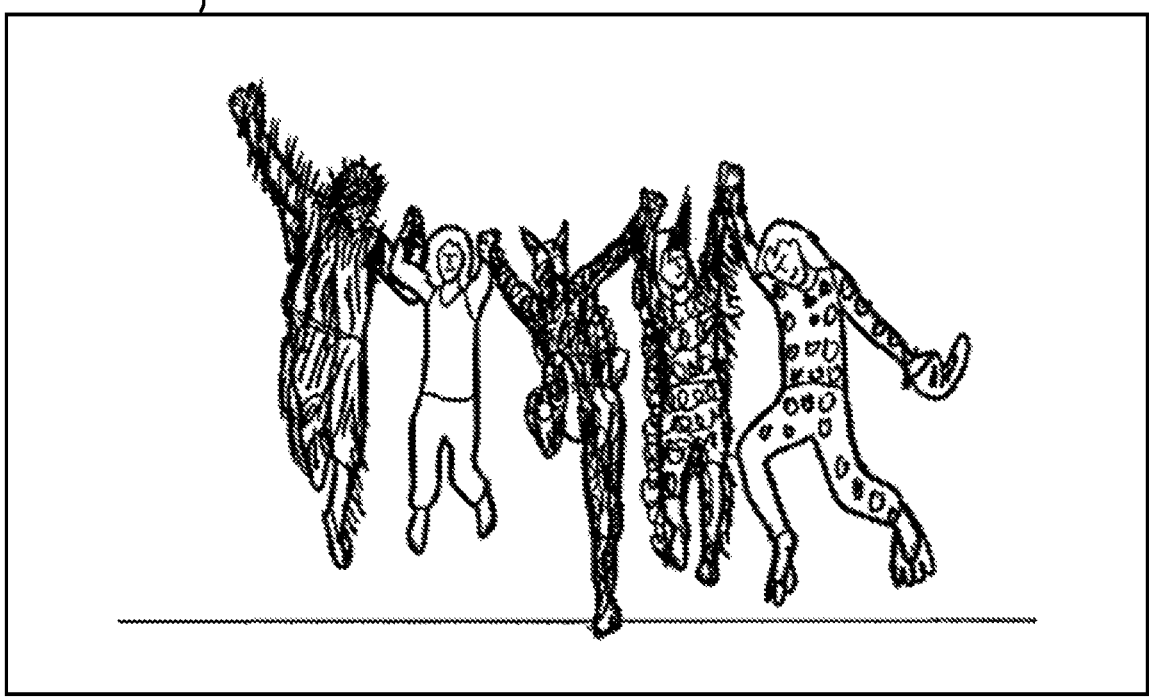

For example, and referring to FIG. 4A, exemplary display 400 of an augmented reality environment is illustrated, in accordance with one or more implementations. Exemplary display 400 may include a view of multiple living entities. For example, exemplary display 400 may illustrate a view of multiple living entities via display device 140. In various implementations, content triggering component 118 may be configured to detect the presence of the multiple living entities and multiple linkage points for each of the living entities visible within the field of view of a user. For example, exemplary display 400 may comprise one of a series of images depicting a field of view of the user, and content triggering component 118 may be configured to detect the living entities and multiple linkage points for the living entities visible within the field of view of a user based on the series of images. Content triggering component 118 may be configured to determine an arrangement of the linkage points detected for the living entities visible within the field of view of a user depicted by exemplary display 400. Based on the arrangement of the linkage points, content triggering component 118 may be configured to identify an action of the living entities. For example, content triggering component 118 may identify the action of the living entities in exemplary display 400 to be jumping. Based on the identified action of the living entities in exemplary display 400 (i.e., jumping), content triggering component 118 may be configured to provide instructions to image generation component 120 to generate images of multiple virtual content items or sets of virtual content to be displayed in the augmented reality environment simultaneously, as discussed below with respect to FIG. 4B.

In various implementations, content triggering component 118 may be configured to identify the living entity. The identification of the living entity may comprise a specific living entity (i.e., a specific user and/or specific pet), a type of living entity (e.g., a specific species, a specific subset of a species, and/or other type of living entity), a predefined group of living entities (e.g., family, friends, co-workers, and/or other group of living entities associated with the user), and/or other one or more other identifications of the living entity. In various implementations, content triggering component 118 may be configured to identify a living entity using facial recognition or body recognition, by recognizing a transponder associated with one or more specific living entities, by recognizing a user device associated with one or more specific living entities, based on audio information associated with one or more specific living entities, by recognizing one or more specific items within the field of view of the user associated with one or more specific living entities, and/or using one or more other recognition techniques. For example, an audio signal for a dog whistle may be processed to obtain audio information that indicates a specific dog associated with the dog whistle. As such, the specific dog (e.g., a neighborhood dog) may be identified upon receipt of audio information associated with the dog whistle. In some implementations, content triggering component 118 may be configured to identify a living entity based on user selection of a living entity. For example, content triggering component 118 may be configured to identify a living entity based on user selection of a living entity received via a user interface generated by user interface component 114. In some implementations, content triggering component 118 may be configured to identify multiple living entities simultaneously.

In various implementations, content triggering component 118 may trigger images of virtual content to be rendered in an augmented reality environment based on the identification of the living entity. Each specific living entity, type of living entity, and/or group of living entities may be associated with specific virtual content. That is, virtual content information may define virtual content items to be displayed when a specific living entity, type of living entity, and/or group of living entities is present. Based on the identification of the living entity, content triggering component 118 may be configured to cause content management component 116 to obtain virtual content information defining particular virtual content that is to be displayed when the identified living entity is identified and cause image generation component 120 to generate an image of the particular virtual content to be displayed in the augmented reality environment. For example, content triggering component 118 may be configured to provide an indication to content management component 116 of the identified living entity and cause content management 116 to obtain virtual content information based on the indication of the identified living entity. The virtual content information obtained may define the virtual content item to be displayed when the identified living entity is present within the field of view of the user. Based on the virtual content information obtained, content triggering component 118 may be configured to provide instructions to image generation component 120 to generate an image of the virtual content to be displayed in an augmented reality environment based on the virtual content information obtained via content management component 116. In some implementations, a user may select the virtual content information to be obtained by selecting the virtual content the user's wishes to display and/or modify. In such case, content triggering component 118 may be configured to provide instructions to image generation component 120 to generate an image of the selected virtual content to be displayed in an augmented reality environment based on the virtual content information obtained via content management component 116.

Image generation component 120 may be configured to generate an image of virtual content to be displayed in an augmented reality environment. In various implementations, image generation component 120 may be configured to generate an image of virtual content to be displayed in an augmented reality environment visible via display device 140. Images of virtual content generated by image generation component 120 may be presented via a display of display device 140 in conjunction with the real world so that the virtual content appears as if it exists in the real world. In various implementations, image generation component 120 may be configured to generate an image of virtual content to be displayed in an augmented reality environment based at least on a user's field of view and virtual content information obtained via content management component 116. In some implementations, image generation component 120 may be configured to generate images of multiple virtual content items or sets of virtual content to be displayed in the augmented reality environment simultaneously. For example, a first virtual content item based on a first reference frame may be depicted simultaneously with a second virtual content item based on a second reference frame.

In various implementations, image generation component 120 may be configured to generate an image of virtual content to be displayed in an augmented reality environment based on a user's field of view. When utilizing display device 140, a display of the display device may contain a view of the real world based on the user's field of view. A user's field of view may be defined based on orientation information, location information, and/or other information. For example, a user's field of view may be defined based at least on orientation information associated with display device 140 and location information associated with display device 140. Orientation information may define an orientation of display device 140. In some implementations, the orientation of display device 140 may refer to one or more of a pitch angle, a roll angle, a yaw angle, and/or other measurements. Orientation information may be obtained from an orientation sensor of display device 140. When looking through display device 140, the orientation of display device 140 may indicate the direction of a user's gaze. In some implementations, one or more eye tracking techniques now known or future developed may be used to determine the direction of gaze of a user. For example, display device 140 may capture the images of a user within a display device and extract a position of the user's eyes. The position of the user's eyes may be used to determine a more precise indication of the direction of the user's gaze. Location information may identify a physical location of display device 140. In some implementations, the physical location of display device 140 may refer to the geographic location of display device 140. Location information may identify a physical location based on GPS coordinates, an address, a relative position with respect to one or more identified locations, and/or other information. Location information may be obtained from a GPS component of a user device, display device 140, and/or other component of system 100. By determining the direction of a user's gaze and the user's physical position in the real world, a user's field of view may be determined.

In various implementations, image generation component 120 may be configured to generate an image of virtual content to be displayed in an augmented reality environment based on virtual content information obtained via content management component 116. In implementations in which the virtual content comprises a virtual content item, the image of the virtual content item may comprise a three-dimensional virtual image of the item. Virtual content information may define virtual content (or a set of virtual content), a reference frame of the virtual content, and/or a correlation between linkage points and the reference frame of the virtual content. Linkage points may be defined with respect to a living entity in the real world. The linkage points may serve as an anchor for the reference frame of the virtual content. As such, when rendered in an augmented reality environment by display device 140, the virtual content may appear within a user's field of view based on how the reference frame of the virtual content is correlated to the real world by virtue of the position of the linkage points (and the living entity) in the real world.

In various implementations, virtual content information may define a correlation between one or more linkage points and one or more points associated with virtual content. For example, one or more points defining a virtual content item (and its reference frame) in three-dimensional space may be correlated to one or more linkage points of a living entity. Therefore, a reference frame for virtual content may be anchored to multiple linkage points simultaneously.

In various implementations, image generation component 120 may be configured to generate an image of virtual content to be displayed in the augmented reality environment based on a correlation between linkage points and the reference frame of the virtual content. For example, and referring to FIG. 3A, exemplary display 300 of an augmented reality environment is illustrated, in accordance with one or more implementations. In various implementations, content triggering component 118 may be configured to detect the living entity and multiple linkage points for the living entity visible within the field of view of a user. Based on the arrangement of the linkage points, image generation component 120 may be configured to generate an image of virtual content to be displayed in the augmented reality environment. For example, and referring to FIG. 3B, exemplary display 302 of an augmented reality environment is illustrated, in accordance with one or more implementations. Exemplary display 302 may include an image of virtual content superimposed over a view of a living entity in the augmented reality environment. In an exemplary implementation, exemplary display 302 may include an image of virtual content generated by image generation component 120 based on a correlation between linkage points and the reference frame of the virtual content. For example, the correlation between the linkage points and the reference frame of the virtual content may comprise exemplary correlation 200 depicted in FIG. 2. The image of virtual content generated by image generation component 120 may be caused to be rendered in the augmented reality environment via display control component 122.

In various implementations, image generation component 120 may be configured to generate an image of virtual content to be displayed in the augmented reality environment based on the size of the arrangement of the multiple linkage points within the field of view of the user. For example, the size of the arrangement of the multiple linkage points within the field of view of the user may determine the reference frame, or size of the reference frame, for the virtual content to be depicted in the augmented reality environment. In various implementations, image generation component 120 may be configured to generate an image of virtual content to be displayed in the augmented reality environment based on the distance of the living entity from the user. For example, virtual content superimposed on a living entity further away from a user may appear smaller than virtual content superimposed on a living entity closer to the user. In various implementations, image generation component 120 may be configured to automatically generate new images of virtual content to be displayed in the augmented reality environment in real-time as the size of the arrangement of the multiple linkage points changes and/or as the distance of the living entity from the user changes. In some implementations, the size of virtual content may be set to a predefined size and adjusted based on the size of the arrangement of the multiple linkage points. As such, the virtual content may be made to appear larger for a human and smaller for a pet based on the arrangement of the linkage points for each of the human and the pet.

In various implementations, image generation component 120 may be configured to generate an image of virtual content to be displayed in the augmented reality environment based on an action or state of the living entity within the field of view of the user. In some implementations, image generation component 120 may be configured to generate images of multiple virtual content items or sets of virtual content to be displayed in the augmented reality environment based on an action or state of multiple living entities within the field of view of the user. For example, and referring to FIG. 4A, exemplary display 400 of an augmented reality environment is illustrated, in accordance with one or more implementations. Exemplary display 400 may include a view of multiple living entities. The arrangement of the linkage points detected for the living entities visible within the field of view of a user depicted by exemplary display 400 may be detected by content triggering component 118. Based on the arrangement of the linkage points, content triggering component 118 may identify the action of the living entities in exemplary display 400 to be jumping. Based on the identified action of the living entities in exemplary display 400 (i.e., jumping), image generation component 120 may be configured to generate images of multiple virtual content items or sets of virtual content to be displayed in the augmented reality environment simultaneously. For example, and referring to FIG. 4B, exemplary display 402 of an augmented reality environment is illustrated, in accordance with one or more implementations. Exemplary display 402 may include multiple virtual content items displayed in the augmented reality environment simultaneously. In an exemplary implementation, exemplary display 402 may include an image of multiple virtual content items generated by image generation component 120 based on the identified action of the living entities (i.e., jumping) and virtual content information associated with virtual content to be displayed when the action of the living entities is identified. The virtual content information may define a correlation between linkage points and the reference frame of the virtual content used to generate the image of the image of multiple virtual content items. The image of virtual content generated by image generation component 120 may be caused to be rendered in the augmented reality environment via display control component 122.

Figure 5B:
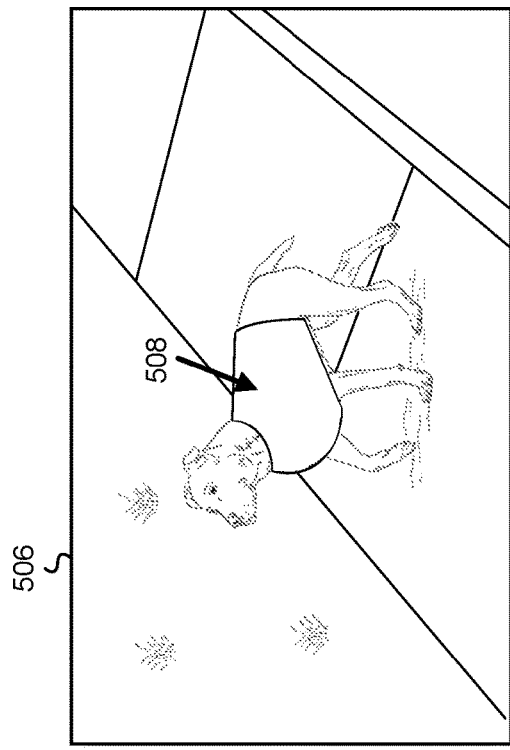
FIG. 5A, FIG. 5B, and FIG. 5C illustrate exemplary displays of an augmented reality environment including virtual content rendered based on a non-human living entity, in accordance with one or more implementations.
Figure 5A:
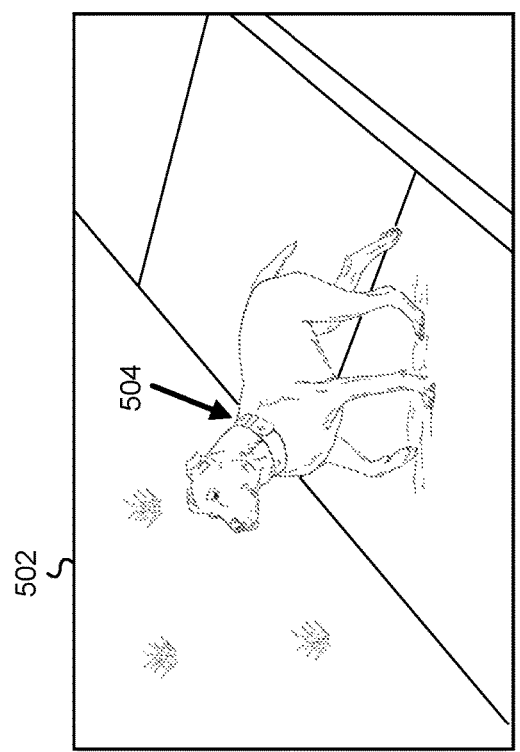
Figure 5C:
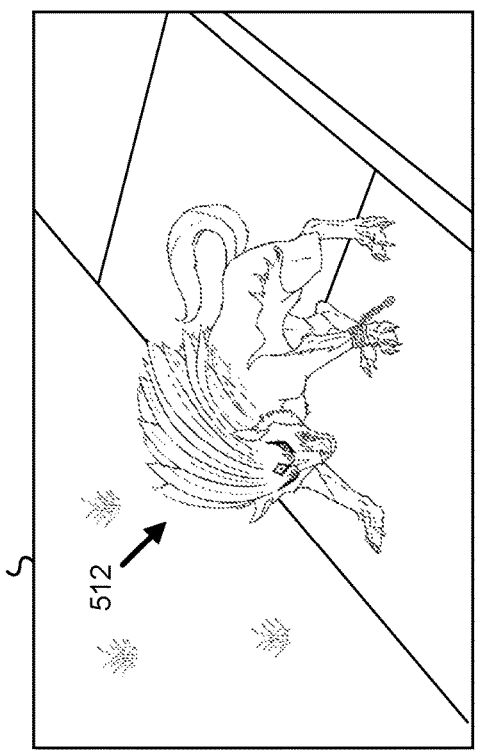

In various implementations, display control component 122 may cause image generation component 120 to generate and render an image of virtual content in an augmented reality environment based on a non-human living entity. For example, FIG. 5A, FIG. 5B, and FIG. 5C illustrate exemplary displays of an augmented reality environment including virtual content rendered based on a non-human living entity, in accordance with one or more implementations. Exemplary display 502 depicts a view of a non-human living entity—i.e., a dog. The presence of the dog in the field of a view of a user may be detected by content triggering component 118 using one or more of the techniques described herein. For example, content triggering component 118 may be configured to detect the presence of the dog within the field of view of the user based on transponder 504 of the living entity. In exemplary display 502, transponder 504 may be located on or within a dog collar or other wearable device of the dog. Exemplary display 506 depicts a view of the same non-human living entity (i.e., the same dog) wearable item 508 may be used to detect the presence of the dog within the field of view of the user. For example, wearable item 508 may comprise a vest and/or other pet accessory worn by the dog to facilitate the rendering of virtual content based on the dog in the augmented reality environment. In some implementations, wearable item 508 may comprise a set of linkage points that may serve as an anchor for virtual content in the augmented reality environment. For example, each of the set of linkage points of wearable item 508 may be predefined and correlated with virtual content to be presented based on the dog. In other words, each of the linkage points may be predefined to represent points on the dog that may be correlated with points of the virtual content. In some implementations, wearable item 508 may include a transponder. Transponder 504 and/or a transponder of wearable item 508 may be configured to provide at least one linkage point of the living entity (i.e., the dog). The at least one linkage point may be predefined so as to be associated with a specific linkage point with respect to a correlation of the linkage points and the arrangement of linkage points. For example, the at least one linkage point defined based on transponder 504 and/or a transponder of wearable item 508 may be predefined as a linkage point identifying the neck or middle of back of the dog. Based on the at least one linkage point, content triggering component 118 may be configured to detect and/or identify one or more additional linkage points. For example, content triggering component 118 may be configured to identify one or more additional linkage points using one or more image recognition techniques, object recognition techniques, and/or body recognition techniques. Based on the arrangement of linkage points, content triggering component 118 may be configured to trigger content to be displayed based on the living entity. For example, and referring to FIG. 5C, exemplary display 510 of an augmented reality environment is illustrated, in accordance with one or more implementations. Exemplary display 510 may include virtual content item 512. Virtual content item 512 may be predefined virtual content associated with the dog. For example, an owner of the dog may select virtual content item 512 as the virtual content to be rendered when the dog is visible within the field of view of a user. As the dog moves within the field of view of a user (either due to movement by the dog and/or movement by the user with respect to the dog), an updated image of virtual content item 512 may be rendered in the augmented reality environment. As such, the virtual content item 512 may be synchronized with the position of the arrangement of linkage points within the field of view of the user so that virtual content item 512 remains superimposed over the dog as the dog moves within the field of view of the user.

In various implementations, image generation component 120 may be configured to generate a new image of virtual content as a user's field of view changes. For example, display device 140 may move as a user utilizing display device 140 changes position and/or rotates display device 140. As display device 140 moves, image generation component 120 may be configured to automatically generate a new image based on the user's current field of view and virtual content information obtained via content management component 116. Therefore, image generation component 120 may be configured to generate a new image of virtual content based at least on a user's current field of view in real-time. In various implementations, image generation component 120 may be configured to obtain an indication of an updated position of display device 140 in the real world at a second time and generate an updated image of virtual content based on the updated position of the display device 140 at the second time and the user's field of view at the second time. Therefore, image generation component 120 may be configured to generate a first image of virtual content to be displayed at a first time based on the field of view of the user at the first time and generate a second image of virtual content to be displayed at a second time based on the field of view of the user at the second time.

In various implementations, image generation component 120 may be configured to generate a new image of virtual content as a living entity moves within a user's field of view. For example, a living entity may move with respect to a user utilizing display device 140 causing the position of the living entity with respect to the user to change, thus, changing the position of the living entity within the user's field of view. As the living entity moves within the user's field of view, image generation component 120 may be configured to automatically generate a new image based on the current position of the living entity within the user's field of view. Therefore, image generation component 120 may be configured to generate a new image of virtual content based at least on the position of the living entity relative to a user's gaze in real-time.

Display control component 122 may be configured to cause an image of virtual content to be displayed in an augmented reality environment via display device 140. In various implementations, display control component 122 may be configured to effectuate transmission of instructions to display device 140. In various implementations, display control component 122 may be configured to generate and/or obtain instructions causing an image of virtual content to be displayed via display device 140. In some implementations, display control component 122 may be configured to cause images of multiple virtual content items or multiple sets of virtual content to be displayed in an augmented reality environment simultaneously via display device 140.

In various implementations, system 100 may be configured to facilitate remote interaction with virtual content depicted in the augmented reality environment by one or more other users. For example, to facilitate remote interaction with virtual content, system 100 may further comprise a content management component and/or remote interaction component as described in co-pending U.S. patent application Ser. No. 15/796,716, entitled "SYSTEMS AND METHODS FOR RENDERING A VIRTUAL CONTENT OBJECT IN AN AUGMENTED REALITY ENVIRONMENT," the disclosure of which is hereby incorporated by reference in its entirety herein.

Electronic storage 130 may include electronic storage media that electronically stores information. The electronic storage media of electronic storage 130 may be provided integrally (i.e., substantially non-removable) with one or more components of system 100 and/or removable storage that is connectable to one or more components of system 100 via, for example, a port (e.g., a USB port, a Firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 130 may be a separate component within system 100, or electronic storage 130 may be provided integrally with one or more other components of system 100 (e.g., a user device, processor 110, or display device 140). Although electronic storage 130 is shown in FIG. 1 as a single entity, this is for illustrative purposes only. In some implementations, electronic storage 130 may comprise multiple storage units. These storage units may be physically located within the same device, or electronic storage 130 may represent storage functionality of multiple devices operating in coordination.

Electronic storage 130 may store software algorithms, information determined by processor 110, information received remotely, and/or other information that enables system 100 to function properly. For example, electronic storage 130 may store virtual content information, an indication of virtual content stored and/or accessible by the system, images generated by image generation component 120, sensor information (e.g., orientation information), device information, location information, and/or other information. In some implementations, electronic storage 130 may store a database comprising information indicating arrangements of linkage points and corresponding states or actions.

Display device 140 may be configured to present virtual content in an augmented reality environment. In various implementations, display device 140 may be configured to generate light and provide the light to an eye of a user such that the light forms images of the virtual content configured to be perceived in the augmented reality environment as if it were present in the real world. Display device 140 may include one or more of a display, one or more sensors, and/or other components. Presentation of virtual content via a display of display device 140 may be facilitated by control signals communicated to display device 140. For example, display control component 122 may be configured to communicate one or more control signals to display device 140. In some implementations, display device 140 may be configured to present content individually to each eye of a user as stereoscopic pairs.

Display device 140 may comprise any device capable of displaying a real-time view of a physical, real-world environment while superimposing images of virtual content over the real-time view of the physical, real-world environment. As such, display device 140 may comprise any device that includes and/or is communicatively coupled to an image capturing device (e.g., a camera and/or any other device that includes an imaging sensor) that may be used to capture a view of the real-world environment.

In various implementations, display device 140 may comprise a smartphone, a tablet, a computer, a wearable device (e.g., a headset, a visor, glasses, contact lenses, and/or any other wearable device), a monitor, a projector, and/or any other device configured to present views of virtual content in an augmented reality environment. In various implementations, display device 140 may include or be associated with one or more speakers for playing one or more sounds associated with a virtual content object. In some implementations, display device 140 may be arranged on, and/or may comprise part of, a headset (not shown in FIG. 1). When headset is installed on a user's head, the user's gaze may be directed towards display device 140 (or at least a display of display device 140) to view content presented by display device 140.

A display of display device 140 may include one or more of screen, a set of screens, a touchscreen, a monitor, a headset (e.g., a head-mounted display, glasses, goggles), contact lenses, and/or other displays. In some implementations, a display may include one or more of a transparent, semi-transparent, reflective, and/or semi-reflective display component, such as a visor, glasses, and/or contact lenses. Images of virtual content may be presented on the display component such that the user may view the images presented on the display component as well as the real-world through the display component. The virtual content may be perceived as being present in the real world. Such a configuration may provide an interactive space comprising an augmented reality environment. By way of non-limiting illustration, display device 140 may comprise an AR headset.

Individual sensors of display device 140 may be configured to generate output signals. An individual sensor may include an orientation sensor, and/or other sensors (e.g., imaging sensor 150). An orientation sensor of display device 140 may be configured to generate output signals conveying orientation information and/or other information. Orientation information derived from output signals of an orientation sensor may define an orientation of display device 140. In some implementations, orientation of display device 140 may refer to one or more of a pitch angle, a roll angle, a yaw angle, and/or other measurements. An orientation sensor may include an inertial measurement unit (IMU) such as one or more of an accelerometer, a gyroscope, a magnetometer, Inclinometers, and/or other devices. In various implementations, the orientation of display device 140 may be communicated to image generation component 120 to generate and/or update images of a virtual content object to be viewed via display device 140. Imaging sensor 150 may be configured to generate output signals conveying a series of images depicting a field of view of the user. In various implementations, imaging sensor 150 may be physically located within display device 140, physically located separate from display device 140, and/or within any of the other components of system 150. For example, imaging sensor 150 may be physically located within a depth sensing camera communicatively coupled to display device 140 and/or one or more other components of system 100.

System 100 may include one or more devices configured to or capable of providing haptic features via tactile output. For example, a user device, display device 140, and/or one or more other components of system 100 may be configured to vibrate based on one or more parameters defining haptic features of virtual content. A haptic feature may comprise one or more effects associated with virtual content observed haptically. For example, effects observed haptically may comprise one or more of a vibration, a motion, a temperature, and/or other haptic effects observed via tactile output. Haptic features may be static or dynamic, and may be haptically observed at a time, over a period of time, at a location, and/or over a range of locations. Virtual content information defining virtual content may define one or more triggers associated with one or more haptic features of the virtual content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 110, electronic storage 130, display device 140, and imaging sensor 150 are shown to be connected to interface 102 in FIG. 1, any communication medium may be used to facilitate interaction between any components of system 100. One or more components of system 100 may communicate with each other through hard-wired communication, wireless communication, or both. For example, one or more components of system 100 may communicate with each other through a network. For example, processor 110 may wirelessly communicate with electronic storage 130. By way of non-limiting example, wireless communication may include one or more of the Internet, radio communication, Bluetooth communication, Bluetooth Low Energy (BLE) communication, Wi-Fi communication, cellular communication, infrared communication, or other wireless communication. Other types of communications are contemplated by the present disclosure.

Although processor 110 is illustrated in FIG. 1 as a single component, this is for illustrative purposes only. In some implementations, processor 110 may comprise multiple processing units. These processing units may be physically located within the same device, or processor 110 may represent processing functionality of multiple devices operating in coordination. For example, processor 110 may be located within a user device, display device 140, and/or other components of system 100. In some implementations, processor 110 may be remote from a user device, display device 140, and/or other components of system 100. Processor 110 may be configured to execute one or more components by software; hardware; firmware; some combination of software, hardware, and/or firmware; and/or other mechanisms for configuring processing capabilities on processor 110.

Furthermore, it should be appreciated that although the various instructions are illustrated in FIG. 1 as being co-located within a single processing unit, in implementations in processor(s) 110 include multiple processing units, one or more instructions may be executed remotely from the other instructions.

The description of the functionality provided by the different computer-readable instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 110 may be programmed by one or more additional instructions that may perform some or all of the functionality attributed herein to one of the computer-readable instructions.

Exemplary Flowcharts of Processes

Figure 6:
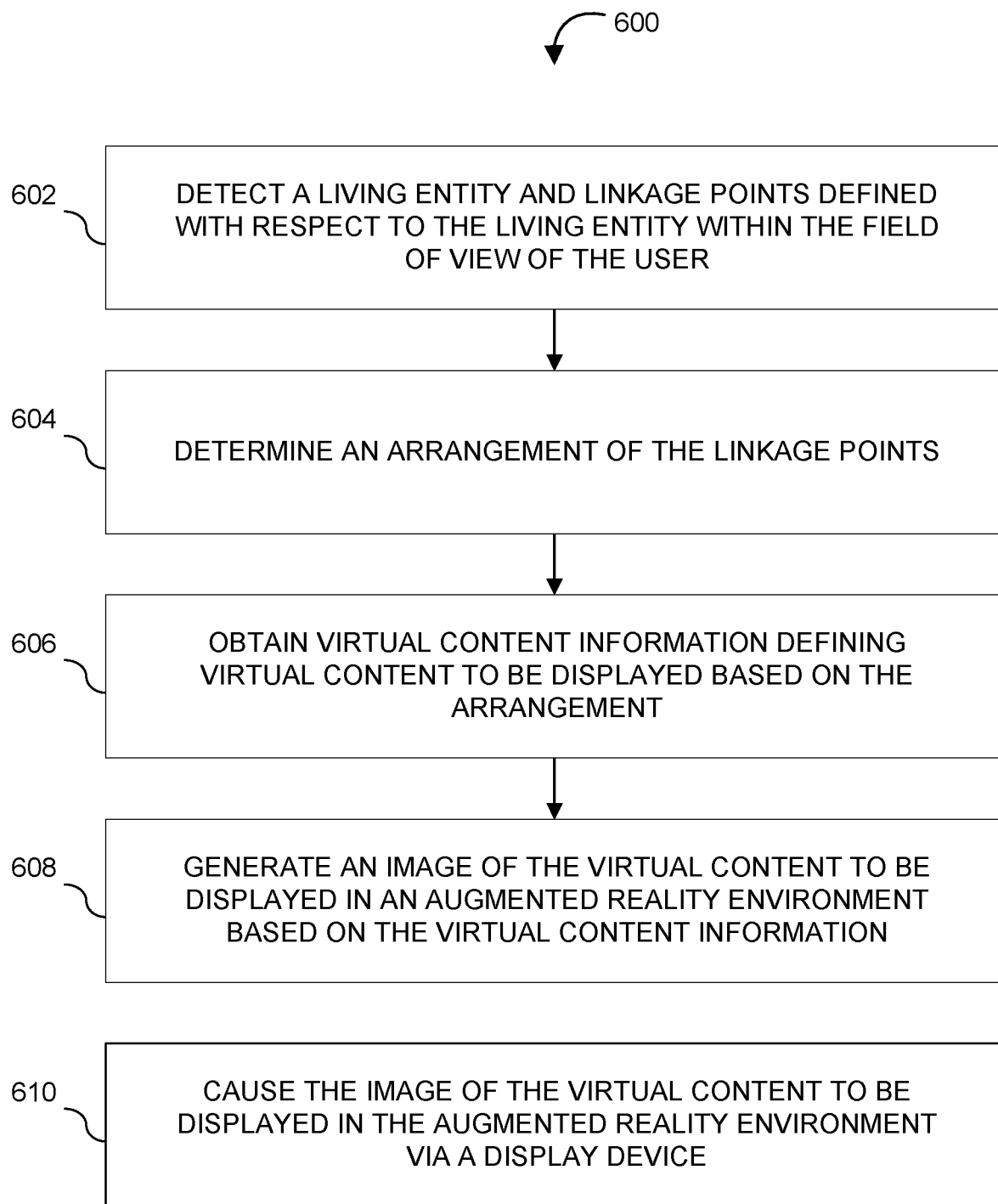
FIG. 6 illustrates a method for rendering a virtual content object in an augmented reality environment based on a living entity, in accordance with one or more implementations.

FIG. 6 illustrates a method 600 for rendering a virtual content object in an augmented reality environment based on a living entity, in accordance with one or more implementations. The operations of method 600 presented below are intended to be illustrative and, as such, should not be viewed as limiting. In some implementations, method 600 may be accomplished with one or more additional operations not described, and/or without one or more of the operations discussed. In some implementations, two or more of the operations may occur substantially simultaneously. The described operations may be accomplished using some or all of the system components described in detail above.

In some implementations, method 600 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 600 in response to instructions stored electronically on one or more electronic storage mediums. The one or more processing devices may include one or more devices configured through hardware, firmware, and/or software to be specifically designed for execution of one or more of the operations of method 600.

In an operation 602, method 600 may include detecting a living entity and multiple linkage points defined with respect to the living entity visible within a field of view of a user. The living entity and multiple linkage points may be detected based on a series of images depicting a field of view of the user obtained from an imaging sensor of a display device. One or more image recognition techniques may be used to detect the living entity and the multiple linkage points for the living entity visible within the field of view of the user. In some implementations, operation 602 may be performed by a processor component the same as or similar to content triggering component 118 (shown in FIG. 1 and described herein).

In an operation 604, method 600 may include determining an arrangement of the multiple linkage points. The arrangement of the multiple linkage points defines the relative position of the linkage points to each other. In some implementations, a state of the living entity or an action of the living entity may be identified based on the arrangement of the linkage points. In some implementations, operation 604 may be performed by a processor component the same as or similar to content triggering component 118 (shown in FIG. 1 and described herein).

In an operation 606, method 600 may include obtaining virtual content information based on the arrangement. Based on the arrangement of the linkage points, virtual content information defining particular virtual content that is to be displayed when the arrangement is present may be obtained. The virtual content information may define a correlation between the arrangement and a reference frame of the virtual content. The virtual content information may be obtained from electronic storage, from one or more devices of the user, one or more connected devices (e.g., a device of a living entity visible within a field of view of the user), and/or via a network (e.g., via the Internet, cloud storage, and/or one or more other networks). In some implementations, operation 606 may be performed by a processor component the same as or similar to content management component 116 (shown in FIG. 1 and described herein).

In an operation 608, method 600 may include generating an image of the virtual content item to be displayed in the augmented reality environment based on the living entity. The image of the virtual content item may be generated based at least on the virtual content information and the field of view of the user. A user's field of view may be defined based on orientation information, location information, and/or other information. Updated images of virtual content may automatically be generated as a user's field of view changes or as a living entity moves within a user's field of view, thus changing the depiction of the virtual content in the augmented reality environment based on the reference frame of the virtual content and its correlation to the position of the linkage points. In some implementations, operation 608 may be performed by a processor component the same as or similar to image generation component 120 (shown in FIG. 1 and described herein).

In an operation 610, method 600 may include causing the image of the virtual content item to be displayed in the augmented reality environment via the display device. In some implementations, updated images of virtual content may be automatically displayed when generated (e.g., as a user's field of view changes or as a living entity moves within a user's field of view). In some implementations, operation 610 may be performed by a processor component the same as or similar to display control component 122 (shown in FIG. 1 and described herein).

For purposes of explanation, numerous specific details are set forth in order to provide a thorough understanding of the description. It will be apparent, however, to one skilled in the art that implementations of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one implementation", "an implementation", "some implementations", "various implementations", "certain implementations", "other implementations", "one series of implementations", or the like means that a particular feature, design, structure, or characteristic described in connection with the implementation is included in at least one implementation of the disclosure. The appearances of, for example, the phrase "in one implementation" or "in an implementation" in various places in the specification are not necessarily all referring to the same implementation, nor are separate or alternative implementations mutually exclusive of other implementations. Moreover, whether or not there is express reference to an "implementation" or the like, various features are described, which may be variously combined and included in some implementations, but also variously omitted in other implementations. Similarly, various features are described that may be preferences or requirements for some implementations, but not other implementations.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system configured to utilize living entities as markers for virtual content viewed in an augmented reality environment, the system comprising:
 a display device configured to superimpose images of visual virtual content over a real-world view of a user to create a visual effect of the augmented reality environment being present in a real world, wherein the real-world view of the user is an outlook of the real world from the point of view of the user;
 one or more physical computer processors configured by computer-readable instructions to:
  obtain an image of a field of view of the real-world view of the user visible via the display device, wherein the field of view is the area that comprises the real-world view of the user;
  detect, based on the image, multiple living entities within the field of view, the living entities being separate and discrete entities from the user;
  identify a living entity based on user selection of the living entity via a user interface displayed via the display device;
  detect multiple linkage points for the living entity;
  determine an arrangement of the multiple linkage points, wherein the arrangement defines the relative position of each of the linkage points to each of the other linkage points of the multiple linkage points;
  dynamically determine virtual content information based on the arrangement, wherein the determined virtual content information defines a virtual content item to be displayed when the arrangement is present and a correlation between the arrangement and a reference frame of the virtual content item, wherein the determining the virtual content information includes determining that the virtual content information is available via the display device;
  obtain the determined virtual content information;
  generate an image of the virtual content item to be displayed in the augmented reality environment based on the living entity, wherein the image of the virtual content item is generated based at least on the virtual content information and the field of view; and
  cause the image of the virtual content item to be displayed in the augmented reality environment so that the image of the virtual content item is superimposed over the living entity in the real-world view of the user such that the user views the image of the virtual content item in the augmented reality environment via the display device.

2. The system of claim 1, wherein the user interface includes one or more selectable controls associated with recording, broadcasting, and/or live streaming, wherein the one or more processors are further configured to:
receive, via user selection of the one or more selectable controls, an indication to broadcast the visual effect of the augmented reality environment being present in the real world from the point of view of the user to one or more display devices of one or more other users via Internet, wherein the one or more other users are remote from the user.

3. The system of claim 1, wherein the arrangement is determined at a first point in time, and wherein the one or more processors are further configured to:
determine a second arrangement of the multiple linkage points at a second point in time, wherein the second arrangement of the multiple linkage points is different from the arrangement of the multiple linkage points at the first point in time;
identify a state of the living entity based on the arrangement and the second arrangement;
obtain second virtual content information defining a second virtual content item to be displayed when the state is identified;
generate an image of the second virtual content item to be displayed in the augmented reality environment based on the living entity; and
cause the image of the second virtual content item to be displayed in the augmented reality environment so that the image of the second virtual content item is superimposed over the living entity in the real-world view of the user such that the user views the image of the second virtual content item in the augmented reality environment via the display device.

4. The system of claim 3, wherein the second virtual content item comprises an animation associated with the state.

5. The system of claim 1, wherein a position of each of the multiple linkage points in the real world defines the reference frame of the virtual content item with respect to the real world and the living entity.

6. The system of claim 1, wherein the image of the virtual content item is generated based further on a position of the display device in the real world and the position of each of the multiple linkage points in the real world.

7. The system of claim 1, wherein the image of the virtual content item is generated based further on the size of the arrangement of the multiple linkage points within the field of view of the user.

8. The system of claim 1, wherein the field of view is defined based on location information and orientation information, the location information indicating at least a current location associated with the display device, and the orientation information indicating at least a pitch angle, a roll angle, and a yaw angle associated with the display device.

9. The system of claim 1, wherein to detect the living entity and the multiple linkage points defined with respect to the living entity, the one or more processors are further configured to:
receive a signal from a transponder of the living entity, wherein the signal from the transponder indicates a location of the transponder and includes triggering information that identifies virtual content to be displayed in the augmented reality environment based on the living entity;
obtain virtual content information based on the triggering information;
detect at least a first linkage point for the living entity based on the transponder, wherein the signal from the transponder defines the position of the first linkage point with respect to the living entity; and
detect one or more additional linkage points based on the position of the first linkage point with respect to the living entity, wherein the multiple linkage points include at least the first linkage point and the one or more additional linkage points.

10. The system of claim 1, wherein to detect the living entity visible within the field of view, the one or more processors are further configured to:
obtain audio information indicating the presence of the living entity within a proximity of the user, wherein the audio information comprises a sound that is associated with the living entity; and
detect the living entity visible within the field of view based on the audio information.

11. A method of utilizing living entities as markers for virtual content viewed in an augmented reality environment, the method comprising:
obtaining an image of a field of view of a real-world view of a user that is visible via a display device, wherein the display device is configured to superimpose images of visual virtual content over the real-world view of the user to create a visual effect of the augmented reality environment being present in a real world, wherein the real-world view of the user is an outlook of the real world from the point of view of the user, wherein the field of view is the area that comprises the real-world view of the user;
detecting, based on the image, multiple living entities within the field of view, the living entities being separate and discrete entities from the user;
identifying a living entity based on user selection of the living entity via a user interface displayed via the display device;
detecting multiple linkage points for the living entity;
determining an arrangement of the multiple linkage points, wherein the arrangement defines the relative position of each of the linkage points to each of the other linkage points of the multiple linkage points;
dynamically determining virtual content information based on the arrangement, wherein the determined virtual content information defines a virtual content item to be displayed when the arrangement is present and a correlation between the arrangement and a reference frame of the virtual content item, wherein the determining the virtual content information includes determining that the virtual content information is available via the display device;
obtaining the determined virtual content information;
generating an image of the visual virtual content item to be displayed in the augmented reality environment based on the living entity, wherein the image of the virtual content item is generated based at least on the virtual content information and the field of view; and
causing the image of the virtual content item to be displayed in the augmented reality environment so that the image of the virtual content item is superimposed over the living entity in the real-world view of the user such that the user views the image of the virtual content item in the augmented reality environment via the display device.

12. The method of claim 11, wherein the user interface includes one or more selectable controls associated with recording, broadcasting, and/or live streaming, further comprising:
receiving, via user selection of the one or more selectable controls, an indication to broadcast the visual effect of the augmented reality environment being present in the real world from the point of view of the user to one or more display devices of one or more other users via Internet, wherein the one or more other users are remote from the user.

13. The method of claim 11, wherein the arrangement is determined at a first point in time, the method further comprising:
determining a second arrangement of the multiple linkage points at a second point in time, wherein the second arrangement of the multiple linkage points is different from the arrangement of the multiple linkage points at the first point in time;
identifying a state of the living entity based on the arrangement and the second arrangement;
obtaining second virtual content information defining a second virtual content item to be displayed when the state is identified;
generating an image of the second virtual content item to be displayed in the augmented reality environment based on the living entity; and
causing the image of the second virtual content item to be displayed in the augmented reality environment so that the image of the second virtual content item is superimposed over the living entity in the real-world view of the user such that the user views the image of the second virtual content item in the augmented reality environment via the display device.

14. The method of claim 13, wherein the second virtual content item comprises an animation associated with the state.

15. The method of claim 11, wherein a position of each of the multiple linkage points in the real world defines the reference frame of the virtual content item with respect to the real world and the living entity.

16. The method of claim 11, wherein the image of the virtual content item is generated based further on a position of the display device in the real world and the position of each of the multiple linkage points in the real world.

17. The method of claim 11, wherein the image of the virtual content item is generated based further on the size of the arrangement of the multiple linkage points within the field of view of the user.

18. The method of claim 11, wherein the field of view is defined based on location information and orientation information, the location information indicating at least a current location associated with the display device, and the orientation information indicating at least a pitch angle, a roll angle, and a yaw angle associated with the display device.

19. The method of claim 11, wherein detecting the living entity and the multiple linkage points defined with respect to the living entity comprises:
receiving a signal from a transponder of the living entity, wherein the signal from the transponder indicates a location of the transponder and includes triggering information that identifies virtual content to be displayed in the augmented reality environment based on the living entity;
obtaining virtual content information based on the triggering information;
detecting at least a first linkage point for the living entity based on the transponder, wherein the signal from the transponder defines the position of the first linkage point with respect to the living entity; and
detecting one or more additional linkage points based on the position of the first linkage point with respect to the living entity, wherein the multiple linkage points include at least the first linkage point and the one or more additional linkage points.

20. The method of claim 11, wherein detecting the living entity visible within the field of view comprises:
obtaining audio information indicating the presence of the living entity within a proximity of the user, wherein the audio information comprises a sound that is associated with the living entity; and
detecting the living entity visible within the field of view based on the audio information.

* * * * *